US009638435B2

(12) United States Patent  
Ambriz et al.

(10) Patent No.: US 9,638,435 B2  
(45) Date of Patent: May 2, 2017

(54) SYSTEMS AND METHODS FOR OPTIMIZING THE EFFICIENCY OF HVAC SYSTEMS

(71) Applicant: Level 3 Communications, LLC, Broomfield, CO (US)

(72) Inventors: Robert Ambriz, Firestone, CO (US); Michael Shane Pittman, Humble, TX (US); Robert Gerald Fiordaliso, Oakwood Hills, IL (US); Robert G. Gillard, II, Denver, CO (US); Louis Basantes, Nashua, NH (US); Rodney David Badley, Coweta, OK (US); Dana Robert Griffin, Broomfield, CO (US); Joseph Ratcliff, Aurora, CO (US); Frank Goyette, Westminster, CO (US); Steve Grogean, Golden, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 458 days.

(21) Appl. No.: 14/168,941

(22) Filed: Jan. 30, 2014

(65) Prior Publication Data

US 2014/0316583 A1    Oct. 23, 2014

Related U.S. Application Data

(60) Provisional application No. 61/813,541, filed on Apr. 18, 2013.

(51) Int. Cl.
*F24F 11/00* (2006.01)

(52) U.S. Cl.
CPC ..... *F24F 11/0012* (2013.01); *F24F 2011/0075* (2013.01); *Y02B 30/542* (2013.01)

(58) Field of Classification Search
None  
See application file for complete search history.

(56) References Cited

U.S. PATENT DOCUMENTS

| | | | |
|---|---|---|---|
| 7,832,465 B2* | 11/2010 | Zou | F24F 3/0442 165/205 |
| 2006/0154596 A1* | 7/2006 | Meneely, Jr. | F24F 11/0017 454/256 |
| 2009/0018673 A1* | 1/2009 | Dushane | G05B 19/042 700/9 |
| 2009/0179080 A1* | 7/2009 | Alston | B60H 1/00378 237/28 |
| 2010/0262357 A1* | 10/2010 | Dupuis | F02D 41/042 701/112 |
| 2011/0031322 A1* | 2/2011 | Zou | F24F 3/0442 236/1 B |
| 2011/0259023 A1* | 10/2011 | Doll, Jr. | F25B 49/005 62/129 |
| 2011/0289951 A1* | 12/2011 | Furlong | F28B 1/06 62/171 |

(Continued)

*Primary Examiner* — Tuan Dao

(57) ABSTRACT

Aspects of the present disclosure disclose systems and methods for controlling the operation and shut down of a plurality of HVAC units in a facility to improve efficiency. More particularly, a target number of inefficient HVAC units may be identified and systematically shut down while monitoring the environmental conditions in the facility to determine if additional HVAC units may be shut down or alternately should be restarted automatically.

31 Claims, 16 Drawing Sheets

(56) References Cited

U.S. PATENT DOCUMENTS

| | | | |
|---|---|---|---|
| 2012/0179300 A1* | 7/2012 | Warren | F24F 11/0012 700/278 |
| 2013/0066479 A1* | 3/2013 | Shetty | G01D 4/002 700/295 |
| 2015/0169024 A1* | 6/2015 | Jammer | G01R 21/133 700/286 |

* cited by examiner

SYSTEMS AND METHODS FOR OPTIMIZING THE EFFICIENCY OF HVAC SYSTEMS

CROSS-REFERENCE TO RELATED APPLICATION

The present non-provisional utility application claims priority under 35 U.S.C. §119 to provisional application No. 61/813,541 titled "Systems and Methods for Optimizing the Efficiency of HVAC Systems" filed on Apr. 18, 2013, which is hereby incorporated by reference herein.

TECHNICAL FIELD

Aspects of the present disclosure relate to systems and methods for automatically and remotely monitoring and controlling the operation of heating, ventilation, and air conditioning (HVAC) systems and machinery to increase and optimize energy efficiency of a data center or other similar facility.

BACKGROUND

Data centers and other facilities that house sensitive electronic equipment, including computer equipment, network equipment, and telecommunication equipment, among others must be maintained in a carefully controlled environment. This equipment often contains sensitive components, such as circuit boards and processors that may not function properly in undesirable environments. For example, excessive heat, including the heat generated by the equipment itself, may cause the sensitive components to malfunction or fail. Similarly, excessive moisture may cause corrosion and other problems for the equipment. As such, the air temperature and humidity are often monitored and controlled to ensure proper operation of the equipment.

Typically, the data centers rely on various heating, ventilation, and air conditioning (HVAC) systems and machinery to control the environment around the electronic equipment. The HVAC systems typically require a large amount of energy to run and therefore present a significant overhead cost to data center operators. Often, the HVAC systems provide more cooling than necessary at various times and locations within the facility. As such, the excess cooling provided by the HVAC units leads to additional unnecessary expense.

Previous efforts to develop control systems for automatically controlling the operation of the HVAC systems have resulted in systems that may shut down one or more HVAC units based on a time schedule. Other systems rely on a network of sensors to monitor and control various HVAC units. These sensor networks, however, are often integrated in the facility and cannot easily be retrofitted, retasked, moved, etc., to alter the operation of an existing system.

Another drawback for many existing HVAC control systems is that they indiscriminately shutdown HVAC units without considering the costs, in terms of power required to start-up and run the units. As such, these systems fail to account for the operational efficiency of the HVAC units and may shut down an efficient unit instead of an underperforming energy inefficient unit.

Therefore, there exists a need for an HVAC control system that may be more easily retrofitted to existing data centers or facilities. In addition, a need exists for an HVAC control system that can automatically monitor and determine which HVAC units are operating at an energy-inefficient level, as well as automatically shutting down the inefficient units to increase the overall energy efficiency of the entire facility and reduce overhead costs.

SUMMARY

The present disclosure relates generally to systems and methods for automatically monitoring and remotely optimizing the energy efficient use of one or more HVAC units within an existing HVAC system for controlling various environmental parameters of an enclosed space. For example, the system may monitor and control the air temperature, humidity, and static pressure within the data center, a telecommunications facility, or any other enclosed space. The systems and methods receive data from one or more sensors to monitor an environment and to determine the efficiency of one or more HVAC units operating in the environment. The systems and methods are used to systematically shut off the least efficient unit(s) and continue monitoring the environment to determine if desired environmental conditions can be maintained with fewer more-efficient HVAC units in operation. Alternately, the systems and methods are also used to determine if additional HVAC units may be shut off or to determine if previously shut-off HVAC units need to be powered on again.

In one embodiment, a system for controlling the operation of one or more heating, ventilation, and air conditioning (HVAC) units includes a database having HVAC unit data and environmental condition threshold data. The system also includes a processor to communicate with one or more sensors, the database, and a plurality of HVAC units. The one or more sensors measure at least one environmental condition and generate environmental condition data. The processor obtains a target number of the one or more HVAC units to be shutdown, obtains environmental condition data from the one or more sensors, and identifies an inefficient HVAC unit of the plurality HVAC units. The processor also generates a shutdown signal to shut down the inefficient HVAC unit, obtains the environmental condition data from the one or more sensors after the shutdown of the inefficient HVAC unit, and determines if the shutdown of the inefficient unit has an adverse impact on the environmental condition data.

In another embodiment, a system for controlling the operation of one or more heating, ventilation, and air conditioning (HVAC) units in a facility includes a database having HVAC unit data and environmental condition threshold data and a processor to communicate with one or more sensors, the database, and a plurality of HVAC units. The one or more sensors measure a temperature of a coolant in a coolant loop and an outside air temperature. The processor obtains coolant temperature from the one or more sensors, determines a difference between the temperature of the coolant and the outside air temperature, and determines an amount of free cooling available to at least one HVAC unit of the plurality of HVAC units when the difference between the temperature of the coolant and the outside air temperature is above a variable coolant temperature threshold. The processor also generates a refrigeration shutdown signal to shut down a refrigeration system of the at least one HVAC unit and determines the effect of the shutdown of the refrigeration system of the at least one HVAC unit on a critical load of the facility.

A method for automatically controlling the operation of a plurality of heating, ventilation, and air conditioning (HVAC) units includes identifying a target number of the plurality of HVAC units to be shutdown, obtaining data generated by one or more sensors, wherein the one or more sensors measure at least one environmental condition, and identifying an inefficient HVAC unit of the plurality of HVAC units. The method also includes shutting down the inefficient HVAC unit, obtaining data from the one or more sensors after shutting down the inefficient HVAC unit to identify changes between the data obtained before shutting down the inefficient HVAC unit and the data obtained after shutting down the inefficient HVAC unit, and determining if the shutdown of the inefficient unit causes an adverse impact on the data generated by the one or more sensors.

The various methods and instructions for systems to control HVAC units may be encoded on a non-transitory computer-readable medium. In one embodiment, a non-transitory computer-readable medium is encoded with instructions for a system for automatically controlling operation of a plurality of HVAC units. The system includes one or more sensors, a database storing data about the operating capacities of each of the plurality of HVAC units and environmental condition threshold values, and a processor in communication with the one or more sensors and the plurality of HVAC units. The instructions are executable by the processor and include identifying a target number of the plurality of HVAC units to be shut down and obtaining data generated by the one or more sensors, wherein the one or more sensors measure data regarding at least one environmental condition. The instructions also include identifying an inefficient HVAC unit of the plurality of HVAC units and generating a shutdown signal to be received at a multi-terminal relay switch operatively engaged to the inefficient HVAC unit, wherein the shutdown signal closes the multi-terminal relay switch to shut down the inefficient HVAC unit. The instructions further include obtaining data generated by the one or more sensors after the shutdown of the inefficient HVAC unit to identify changes between the data obtained before the shutdown and the data obtained after the shutdown and determining if the shutdown of the inefficient unit causes an adverse impact on at least one of the one or more environmental conditions.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. In the drawings the like reference characters refer to the same parts throughout the different views. The drawings depict only typical embodiments of the present disclosure and, therefore, are not to be considered limiting in scope.

DETAILED DESCRIPTION

Figure 1A:
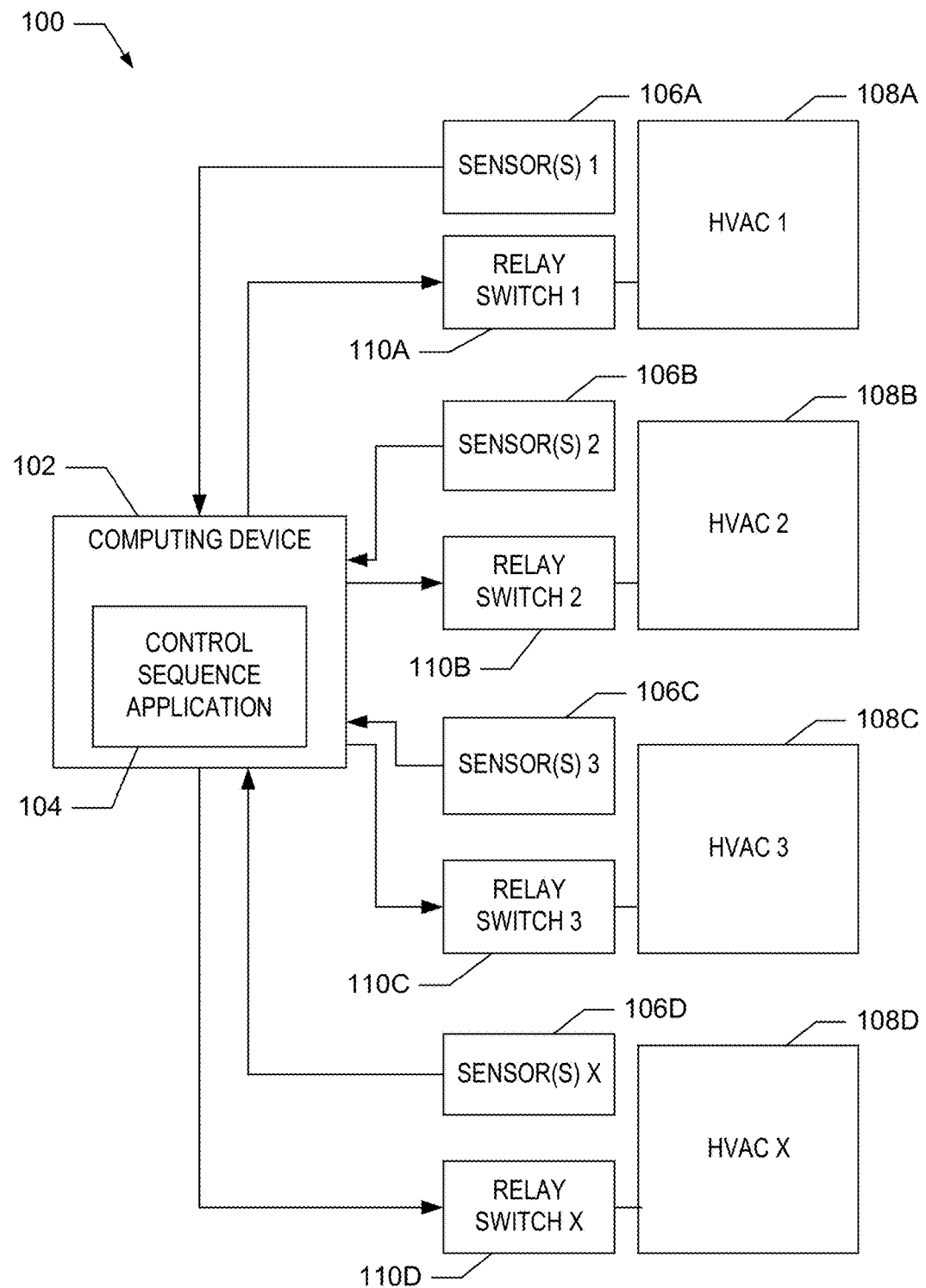
FIG. 1A is block diagram of an HVAC control sequencing system according to one embodiment.

The present disclosure relates to a system and method for remotely and automatically monitoring and controlling the operations of heating, ventilation, and air conditioning (HVAC) systems and machinery to increase and optimize the energy efficiency of HVAC systems to thermally manage enclosed areas. The enclosed area may be a data center, telecommunication center, and any other enclosed area containing temperature-sensitive equipment. The enclosed areas may also refer to portions of a facility, such as floors, wings, sections, or zones within a larger data center, telecommunications center, or similar facility. The data center, telecommunications center, or other facility may house information technology and telecommunications equipment, such as data servers, data storage systems, switches, cabinets, and relay racks, among other equipment ("IT equipment").

In particular, the system monitors the electrical energy or a critical load drawn by the various information technology and telecommunications equipment operating in the facility (the "IT load"). The system also monitors the power drawn by the HVAC units, such as computer-room air conditioner (CRAC) units, as well as the theoretical cooling load output by the HVAC equipment, and the cooling load required to cool the IT equipment in the enclosed area. The IT load is used determine the amount of excess power, if any, drawn by the facility to cool, or otherwise control, the operating environment of the IT equipment. Based, at least in part on any excess in the power drawn, the system determines if one or more of the HVAC units may be shut down to decrease the electrical load drawn by the HVAC equipment and ultimately decrease the costs to cool the enclosed area. In one aspect, the system shuts down the least energy efficient unit first and continues to shut down inefficient units until a sensible cooling level output by the remaining HVAC units approaches the minimum cooling load required for cooling the IT equipment. The system may also identify a target number of units to shut down, representing the maximum number of units that may be shutdown while still being able to sufficiently cool the facility.

In various aspects, the system obtains temperature, humidity, and/or static pressure data from one or more sensors located within the enclosed area or facility. The sensors are associated with one or more HVAC units and distributed according to the design and layout of the facility and/or the individual HVAC units. The system then determines if one or more the HVAC units may be shutdown and monitors the effects of the shutdown to determine if the desired environmental conditions can be maintained with fewer HVAC units in operation. In one aspect, the system shuts down the least energy efficient HVAC units until a predetermined number of units have been turned off. The system then allows the environmental conditions to reach a state of equilibrium and continues to monitors the data from the sensors to see if additional units may be deactivated, or alternately, reactivated if necessary.

In various aspects, the systems and methods of the present disclosure may be retrofitted and implemented in existing data centers or telecommunication centers. As such, the sensors may be configured to monitor existing IT equipment and may be further customized to monitor non-standard or non-uniform HVAC unit distributions. For example, the sensors may be disproportionately concentrated in one region of the facility. In another example, sensors may be intentionally placed near exhaust outlets of the IT equipment in the facility. As such, the system may be configured to ignore high temperature alarms from these sensors. Similarly, the system may be configured to rely on a high temperature threshold before trigging an alarm in response to the data from these sensors.

The present disclosure also relates to a software application executing on a computing device to monitor and display a map of the monitored area, data received from the sensors, the operational status of the various HVAC units, and other related data. The software application allows a user to review the data for an entire floor, multiple floors, or subsections or zones within a floor. In various aspects, the software application, may display an overlay over an existing floor plan to indicate various zones within the floor plan of the data center.

Figure 1B:
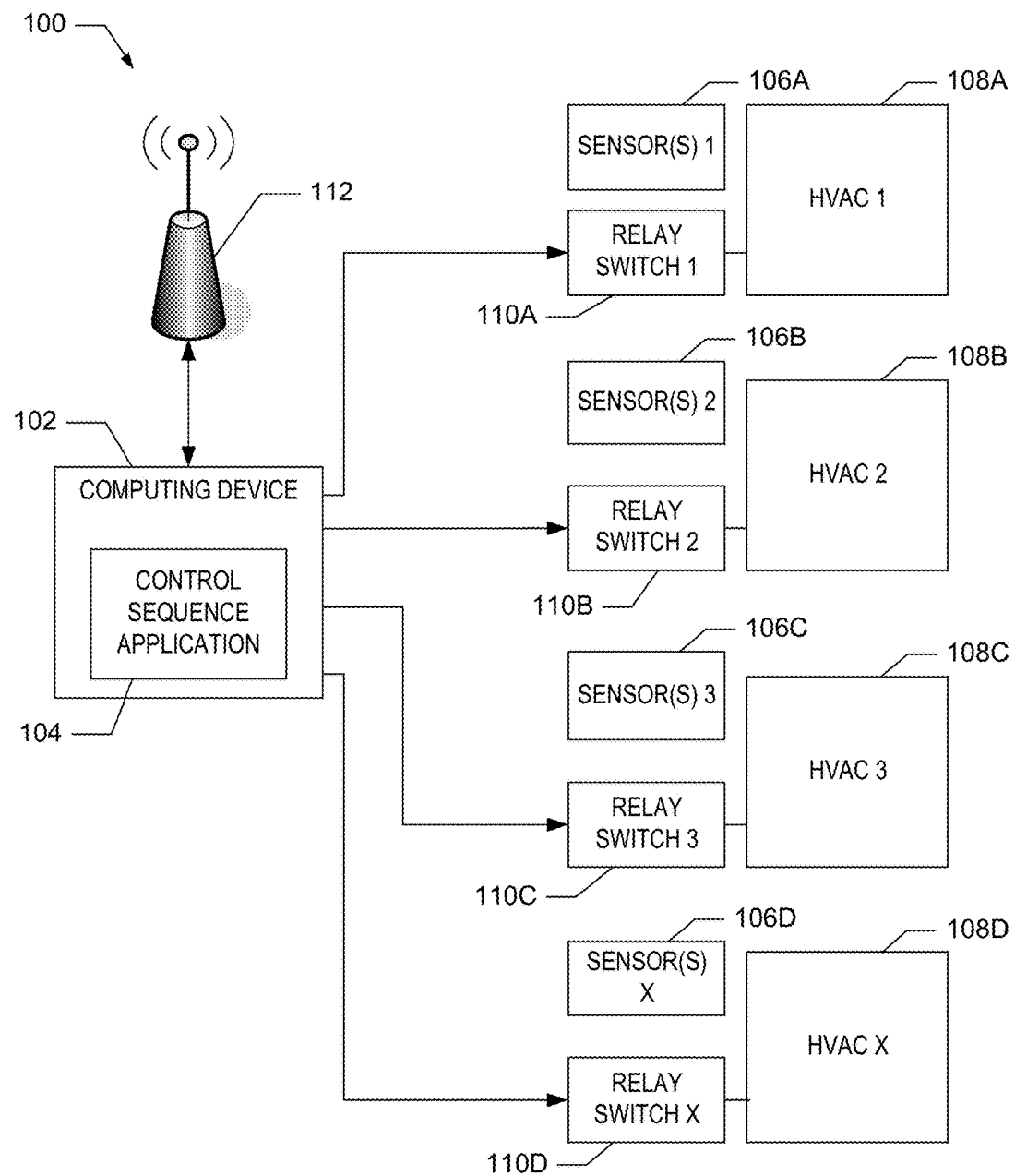
FIG. 1B is block diagram of a wireless HVAC control sequencing system according to one embodiment.

FIGS. 1A-B are block diagrams of embodiments of a HVAC control sequence system 100. In particular, FIG. 1A depicts the control sequence system 100 having wired communication between a computing device and a number of sensors, while FIG. 1B depicts wireless communication between the computing device and the sensors. The system 100 includes a computing device 102 that executes a control sequence application 104 and a number of sensors 106A-D that measure and generate data related to various environmental conditions of the facility, including the air temperature, humidity, relative humidity, and outside air temperature. In various aspects, the sensors measure or collect data for the air temperature and humidity in particular locations of the facility. The air temperature is monitored to prevent excessive heat which may cause the machinery in the facility to overheat. Similarly, humidity and relative humidity data are monitored to prevent unsafe static electricity or condensation due to inefficient and excessive humidity, respectively. By monitoring and controlling the air temperature, the IT equipment and machinery in the facility are kept within desired temperature/humidity ranges. In addition, the computing device 102 and the control sequence application 104 are in electrical communication with one or more HVAC units 108A-D. In particular, the computing device 100 is in wired electrical communication to one or more multi-terminal relay switches 110A-D that are in further electrical communication with each respective HVAC unit 108A-D. The multi-terminal relay switches are closed when the associated HVAC unit 108A-D is operational, and maybe opened to shut down the unit.

In various aspects, when the software application 104 or the user decides to shut down one or more HVAC units 108A-D, a signal is generated at the computing device 102 to activate the electronic control relay and open the multi-terminal relay switch 110A-D associated with the HVAC unit to be shut down.

In other aspects, the sensors may measure data relating to the static pressure generated by the HVAC units 108A-D. Static pressure refers to the pressure exerted on the surfaces of air ducts exclusive of the pressure caused by the velocity of the air in the duct. As such, the static pressure can be used to determine if the HVAC units 108A-D are operating as expected. By way of example, one or more sensors 106A-M may be differential pressure sensors that are positioned adjacent to or in close proximity to one or more perforated floor tiles of a facility having a raised floor that contains one or more plenums or other air conduits. The sensors may be configured to measure the pressure of air flowing through the perforated tiles and transmit that data to the computing device 102 and the application 104.

In various aspects, the sensors 106A-D may be in wired or wireless communication with the computing device 102. The sensors may any suitable sensors for measuring the environmental data within the facility and transmitting the data to the computing device 102. By way of example and not limitation, the sensors 106A-D may be wireless sensors, such as those used in the AZW-5000 wireless sensor system by Alteron® of Redmond, Wash. When wireless sensors 106A-D are used, the wireless sensors may transmit the measured data to sensor reception device 112 that is in communication with the computing device 102. The reception component may be portable or statically located with in the data center. The use of wireless sensors and a reception device 112, allows the system 100 to be more easily retrofitted to existing data centers and telecommunication facilities.

In one aspect, the sensors 106A-D may be distributed evenly throughout the data center. In another aspect, the sensors 106A-D are positioned according to an "area of impact" related to each HVAC unit 108A-D. The area of impact refers to area(s) of the data center upon which each the HVAC unit has the most influence, including but not limited to air intakes and outputs.

For each HVAC unit 108A-D, the area of impact may be the region immediately adjacent to the unit or its output vents, in one aspect. In other aspects, the area of impact may be located away from the unit itself due to ducting or other airflow controls. Moreover, multiple units may have over lapping or intersecting areas of impact. As such, the area of impact for each HVAC unit 108A-D may be defined and customized by a user of the system 100. In response to data gathered by the sensors 106A-D, the control sequence application 104 can automatically shut down one or more HVAC units 108A-D. Similarly, a user of the application 102 may manually cause one or more HVAC units 108A-D to be remotely shut down.

Figure 2:
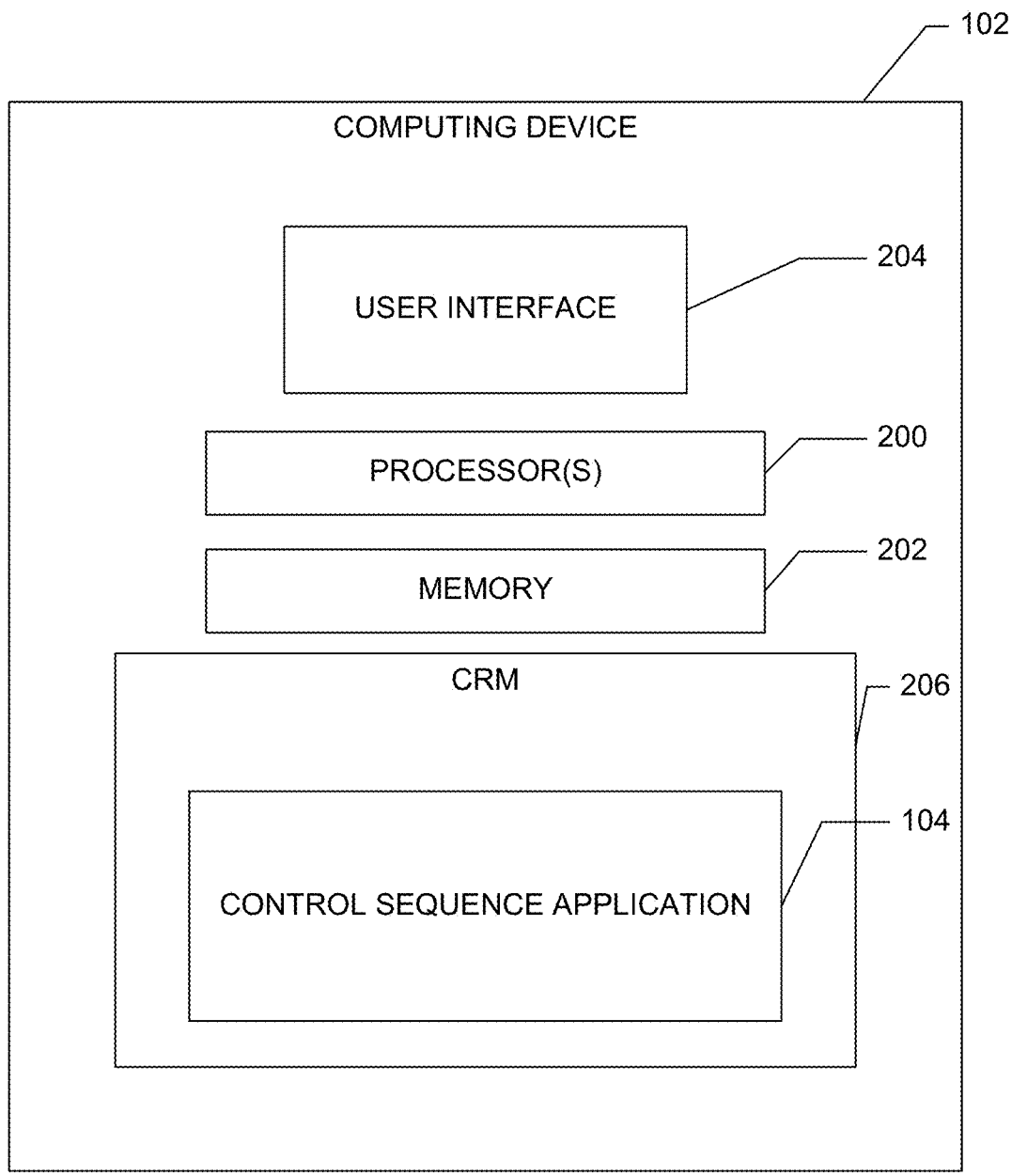
FIG. 2 is block diagram of an embodiment of a computing device for use with the HVAC sequencing system, according to aspects of the present disclosure.

The computing device 102 may be a personal computer, workstation, server, mobile device, mobile phone, tablet device, a processor, and/or other processing device. Each device may include one or more processors 200 that process software or other machine-readable instructions and may include a memory 202 to store the software or other machine-readable instructions and data, as shown in FIG. 2. The memory may include volatile and/or non-volatile memory. Additionally, each device may also include a communication system to communicate via a wireline and/or wireless communications, such as through the Internet, an intranet, and Ethernet network, a wireline network, a wireless network, a mobile communications network, and/or another communication network. In one embodiment, the computing device receives data from the sensors 106A-D through one or more Universal Serial Bus (USB) ports (not shown) or via the wireless reception device through any suitable connection.

The computing device 102 may include a user-interface (UI) 204 to receive input from a user. The UI 204 may include a display such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device for receiving input.

The computing device 110 may include a computer readable media ("CRM") 206, which may include computer storage media, communication media, and/or another available computer readable media medium that may store executable instructions to implement a HVAC control sequence application 104 for recording, analyzing, displaying, and/or otherwise using the temperature data received or obtained from the sensors 106A-D. For example, the CRM 206 may include non-transient computer storage media and communication media. By way of example and not limitation, computer storage media includes memory, volatile media, nonvolatile media, removable media, databases, and/or non-removable media implemented in a method or technology for the storage of information, such as machine/computer readable/executable instructions, data structures, program modules, or other data. Communication media includes machine/computer readable/executable instructions, data structures, program modules, or other data. Generally, program modules include routines, programs, instructions, objects, components, data structures, etc., that perform particular tasks or implement particular abstract data types.

The processor 202 may launch, run, execute, interpret or otherwise perform the logical instructions, generate one or more user interface or graphic displays and/or processes of the HVAC control sequence application 104. These include but are not limited to one or more graphical displays that may be used to monitor data related to individual zones, individual HVAC units, and individual sensors within the facility, as shown in FIGS. 3-7.

Figure 3:
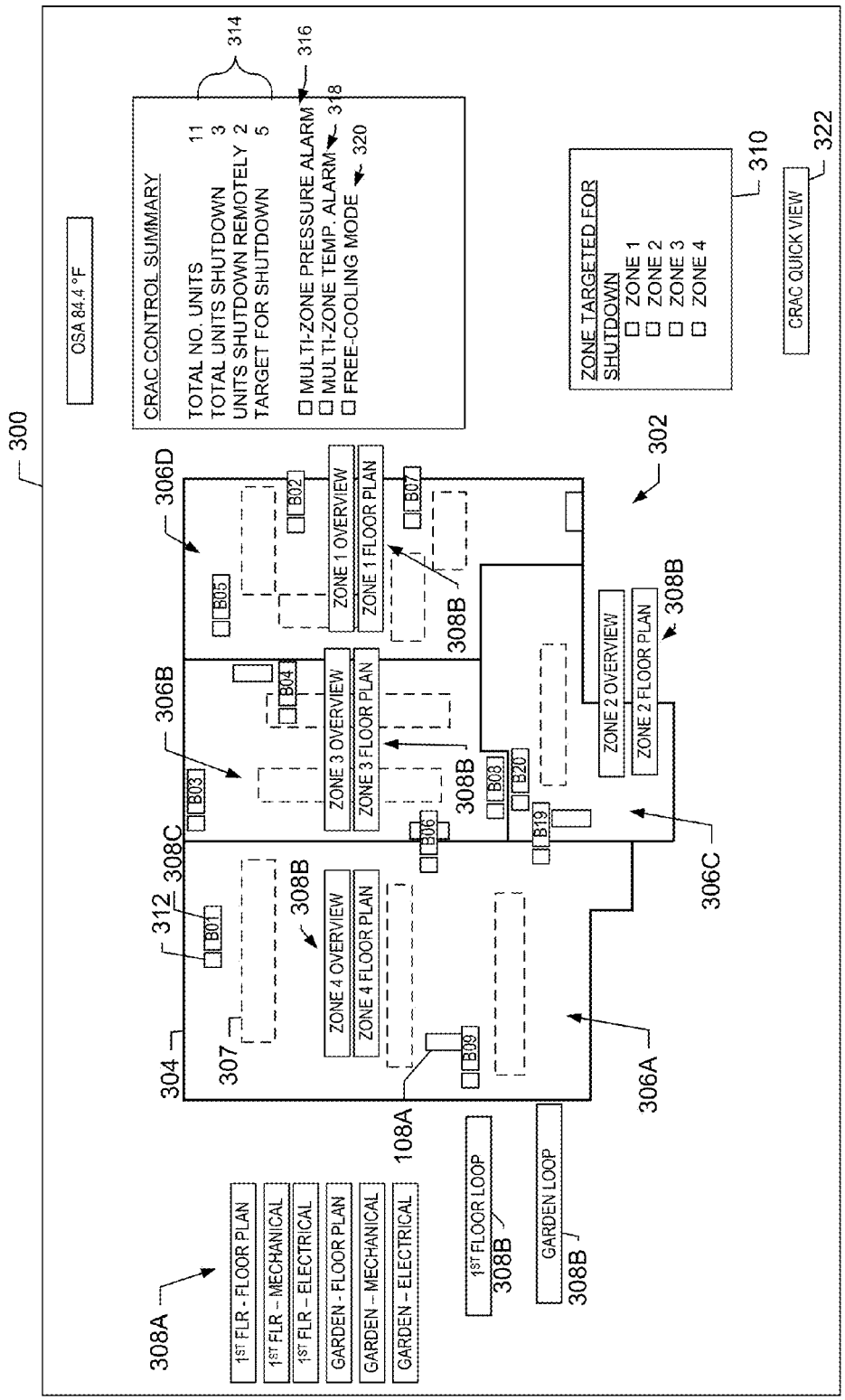
FIG. 3 is a floor plan graphical display of a data center environment generated by an HVAC control sequence application that can be monitored and optimized by the HVAC sequencing system, according to aspects of the present disclosure.

As the system may be retrofitted to existing systems, the control sequence application 104 allows a user to define and designate zones as desired. Therefore, the user defined zones may be displayed in an overlay over an image, such as a bitmap, of the existing data enter layout. For example, FIG. 3 depicts a floor plan display 300 that is generated by the HVAC control sequence application 104. The floor plan display 300 depicts the floor plan 302 of a data center with a zone and loop overlay 304 to indicate the various zones 306A-D and loops 308A-B of the data center. In various aspects, the loops 308A-B may include, but are not limited to hot and chilled water loops, condenser loops, coolant loops, and air loops that may be used to model the air and water distribution systems of the facility. By way of example and not limitation, a zone may be approximately 5,000 square foot; however, other area dimensions may be used. Therefore, an example floor plan of approximately 20,000 square feet may include approximately four or five zones that may be monitored and controlled individually. In one aspect, the floor plan display 300 includes a number of interactive elements, controls, buttons, or other interactive components 308A-D that allow the user to access additional information and displays. For example, a first set of interactive elements 308A, allow the user to view floor plans depicting layouts of various equipment, such as the layout of mechanical equipment and IT equipment 307. Similarly, the interactive elements 308A may also allow the user to view various layouts of different floors.

Figure 5:
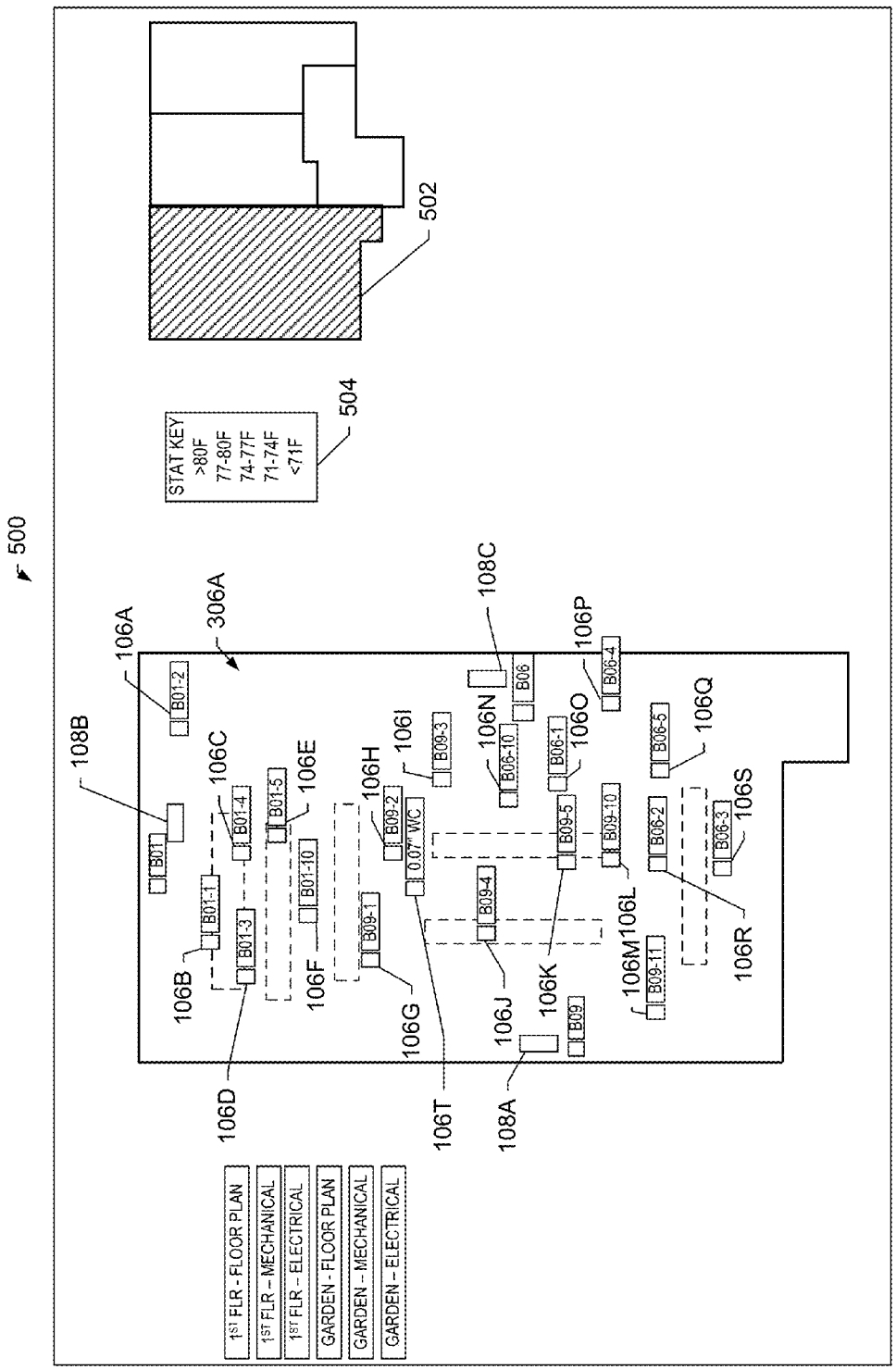
FIG. 5 is a zone mapping graphical display generated by a HVAC control sequence application executing on a computing device, according to aspects of the present disclosure.
Figure 6:
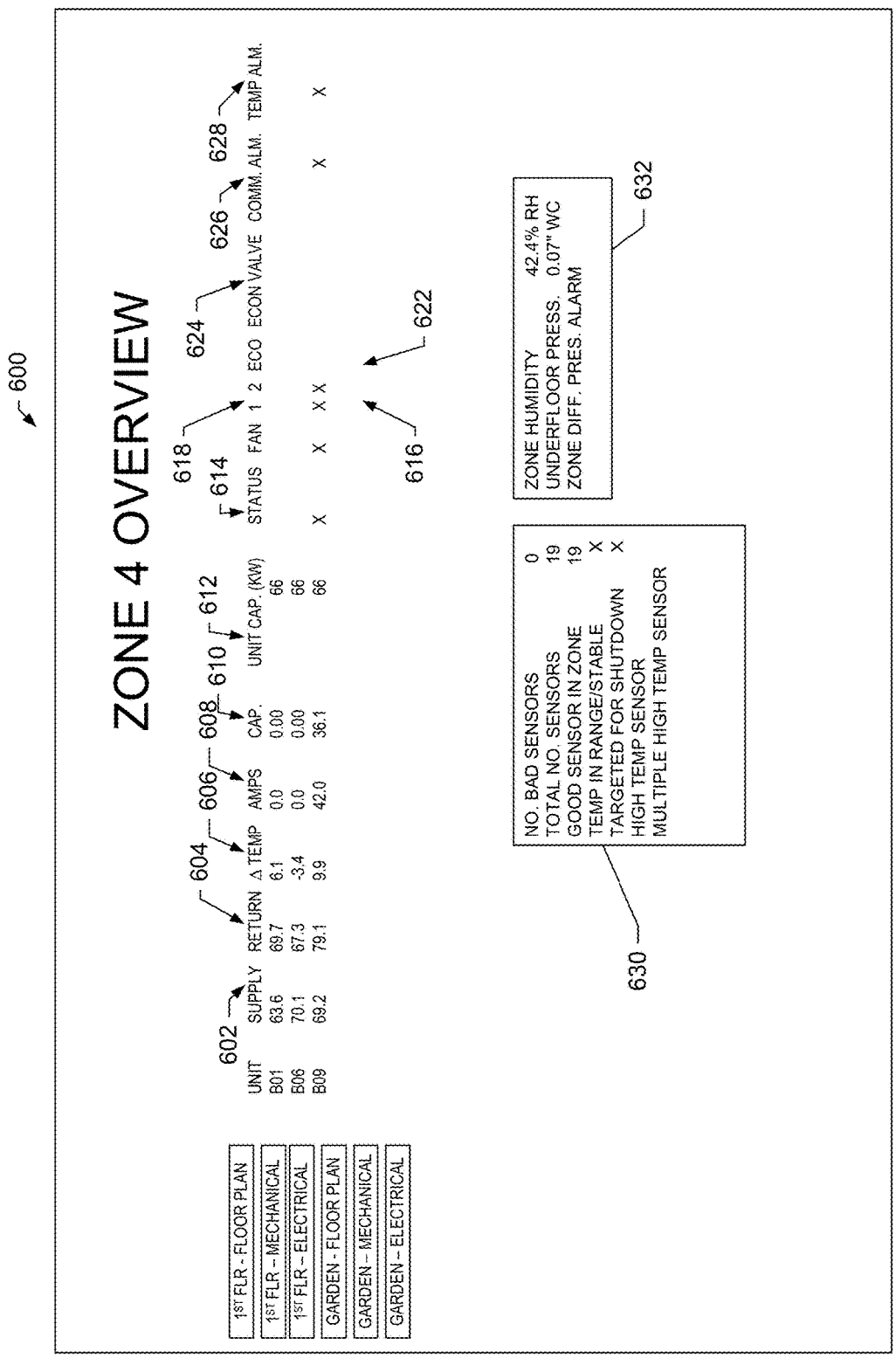
FIG. 6 is a zone overview graphical display generated by a HVAC control sequence application executing on a computing device, according to aspects of the present disclosure.

Other sets of interactive elements 308B allow the user to view data specific to particular zones 306A-D or loops (not shown) within the floor plan 302. For example, the user may interact with the elements 308B to view detailed views of a particular zone, for example zone 4 as shown in FIGS. 5-6. The floor plan display 300 also provides a visual indication 310 identifying which zones 306A-D are monitored and have one or more HVAC units therein capable of being remotely shutdown.

As shown in the floor plan display 300, the locations for numerous HVAC units, such as HVAC unit 108A, are displayed on the floor plan 302 along with interactive unit status elements (B01-B20) including example status element B01, as indicated by 308C, that correspond to each HVAC unit. In one aspect, each unit status marker 308C also includes color-coded indicators 312 to visually indicate the status of the corresponding HVAC units. For example, the color-coded indicators 312 may be green to indicate that the corresponding HVAC unit 108A is operational. Conversely, the color-coded indicators 312 may be yellow to indicate that the unit is operating inefficiently or red to indicate that the corresponding HVAC unit has been shut down. Similarly, other indicator(s) or colors may be used to indicate other states for the HVAC units, such as but not limited, a maintenance state or a manually overridden operational state.

The floor plan display 300 also provides a summary of data regarding the entire control sequence, as indicated by 314. In one aspect, the summary data includes the total number of HVAC units on the floor, the total number of HVAC units shut down, the number of HVAC units shut down remotely by the system, as well as the target number of HVAC units for shutdown.

In various aspects, the target number of HVAC units for shut down refers to the maximum number of units that may be shutdown, while still maintaining the minimum cooling capacity for the floor. The system 100 will attempt to reach the target number by shutting down the least energy efficient units sequentially until the target number is reached. In various aspects, however, the user may designate one or more units as being critical units. Critical units are excluded from the target shutdown units, regardless of the efficiency of the critical units. Particular HVAC units may be designated as critical units due to their location within the facility, due to the IT equipment or other HVAC units within their area of impact, or for any other reason as determined by the user.

Figure 10:
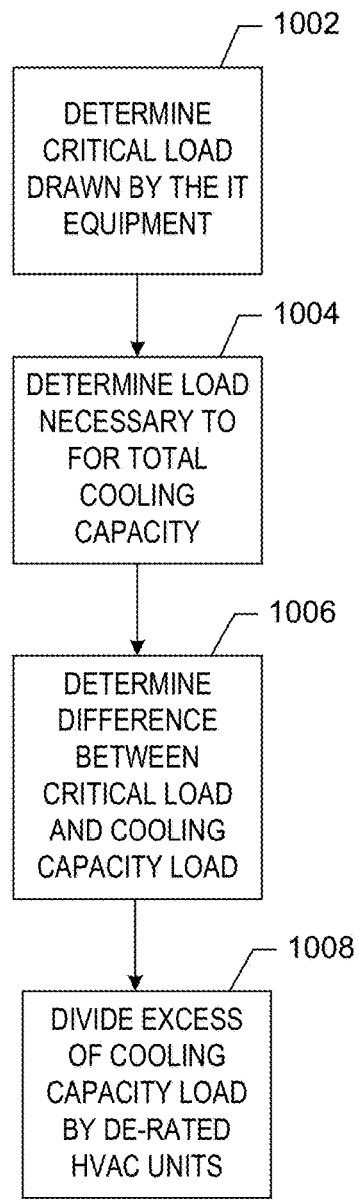
FIG. 10 is a flowchart illustrating a method for determining the target number of HVAC units to shut down, according to aspects of the present disclosure.

FIG. 10 is a flow diagram of a method 1000 for determining the target number of HVAC units for shutdown, generally indicated as 314 in FIG. 3. At 1002, a critical load calculation is performed to determine the total of the electrical load drawn by the various IT equipment (the "IT load" or "critical load"). This critical load calculation is based on the load from one or more direct current (DC) power plants and one or more uninterruptable power supplies (UPS) at the facility. In particular, the critical load in kilowatts is determined by subtracting the derated cooling capacity for the HVAC units from the total of the DC power plant load plus the UPS load of the facility. This critical load is approximately equal to the load drawn by the "IT load." The electric load drawn by the HVAC units can be used to determine the actual operating output of the units. For example, according to hypothetical manufacturer's specifications, an HVAC unit operating at the recommended capacity and maximum efficiency may provide approximately 3-3.5 kilowatt-hours kWh per cooling ton. As such, any variance from the specified rate of power usage may be indicative of an underperforming unit or an energy inefficient unit. At 1004, the total sum of the electric load required by the IT load and that of the HVAC units to achieve the necessary sensible cooling capacity for the facility is calculated. As used herein, the sensible cooling capacity refers to the amount of heat energy the HVAC unit can be expected to remove from the air. The difference between the total electric load, as determined at 1004 and the IT load, as determined at 1002, is calculated at 1006 to determine the excessive cooling capacity drawn by the HVAC units. The HVAC units are assigned a derated value determined by the expected performance of the units as based on the desired cooling strategies and the age of the HVAC units. The excess cooling capacity load is divided by the derated unit value at 1008 to determine the targeted "Total Cooling Unit Shutdown" number. If the number of total units determined at 1008 is not an integer, the system 100 rounds down to the nearest integer, thereby allowing for an additional safety "buffer" when all of the targeted number of HVAC units are shutdown.

By way of example, if the facility has twenty HVAC units that are listed by the manufacturer as having a capacity of approximately twenty cooling tons, the units may have a derated value of approximately 44 kW of sensible cooling, based on the age of the units and the desired cooling strategies of the facility. Therefore, the total cooling capacity for this facility is approximately 880 kW (20 units×44 kW). If the facility has an IT load of approximately 350 kW, then subtracting the critical load (350 kW) from the total cooling capacity of the facility (880 kW) yields 530 kW of excess cooling capacity. The excess cooling capacity of 530 kW is then divided by the derated value of 44 kW (530 kW/44 kW=~12.045 HVAC units). This number rounded down to 12 units, which will be targeted for shutdown. Therefore, at a minimum, eight units will remain operational while up to twelve units may be shutdown.

Referring again to FIG. 3, the floor plan display 300 includes indicators 316-318 to signal if any pressure or temperature alarms, respectively, in two or more zones are simultaneously triggered. The floor plan display 300 also includes an indication 320 if the facility has entered a free-cooling mode. As used herein, the term "free cooling" or the like refers to a cooling mode where external environmental features, such as but not limited to, cooler outside air temperatures or nearby bodies of water are used, in whole or in part, to replace or produce chilled water while minimizing or eliminating the need to run the chiller mechanism of each HVAC unit 108A-K. As such, in the free-cooling mode, all of the HVAC units 108A-K may use less electricity as the chiller need not operate at its normal level. The floor plan display 300 also includes the interactive element 322 that allows the user to view additional overview data regarding the entire floor.

Figure 4:
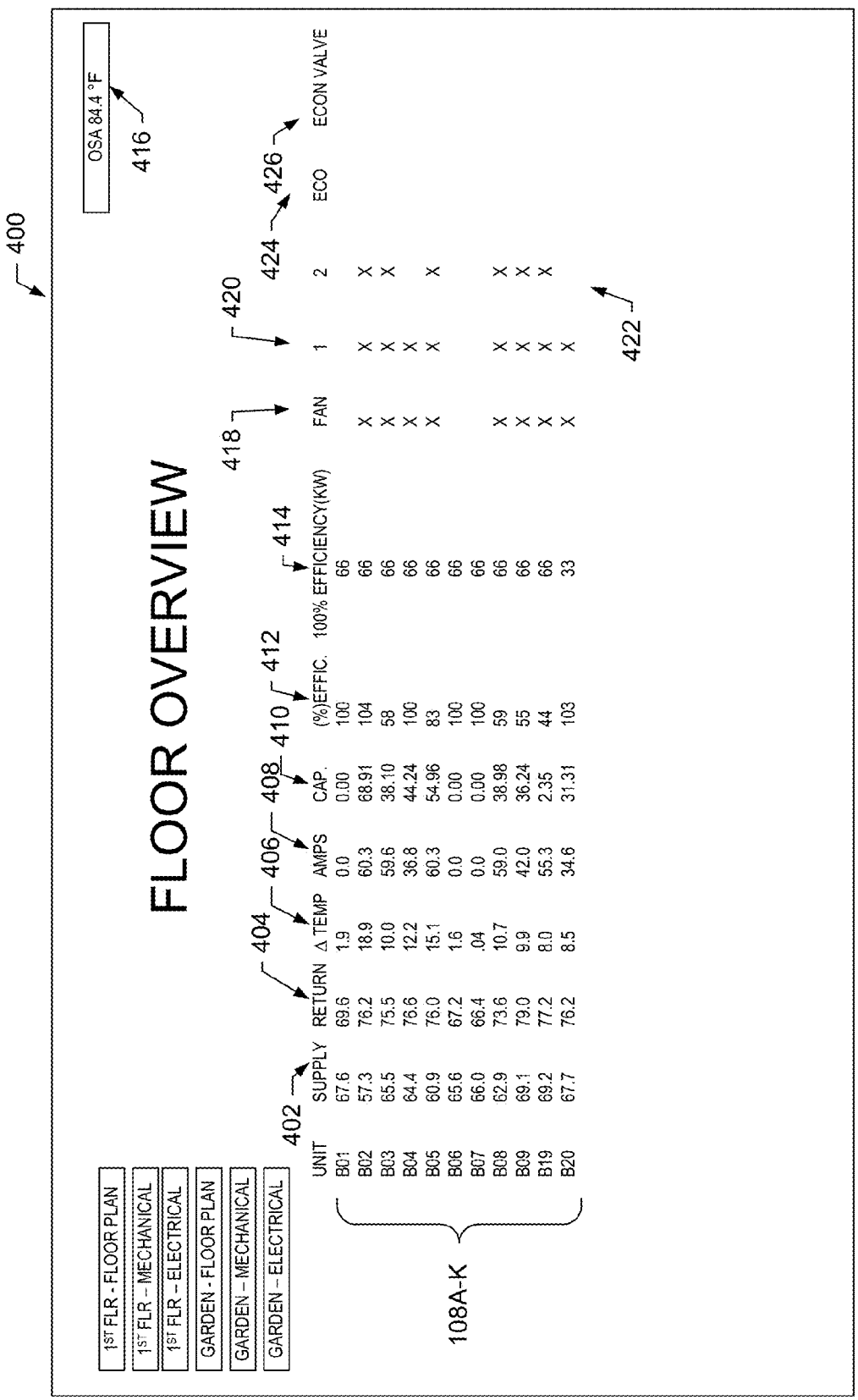
FIG. 4 is graphical display of a floor overview generated by an HVAC control sequence application executing on a computing device, according to aspects of the present disclosure.

Upon clicking the element 322, the control sequence application 104 generates a floor overview display 400, as shown in FIG. 4. The floor overview display 400 provides a more detailed overview of information regarding each HVAC unit 108A-K, on the floor plan 302, as shown in FIG. 3. The floor overview display 400 provides additional details for each HVAC unit 108A-K including various temperature readings around each HVAC unit. In particular, the floor overview display 400 identifies the current temperature at the input and output for each unit, as well as the temperature difference between the input and output (ΔT), indicated as 402-406, respectively. The overview display further displays data regarding the current being drawn during operation of the unit, cooling capacity, calculated efficiency, and maximum theoretical cooling capacity for each unit, indicated as 408-414, respectively.

The calculated efficiency 412 of each HVAC unit is determined with a user-defined maximum theoretical cooling capacity 414. The maximum theoretical cooling capacity of each HVAC unit 108A-K takes into consideration the total environment of the facility, including but not limited to, the altitude, outside air temperature 416, and the average outside air temperature for the facility.

Figure 11:
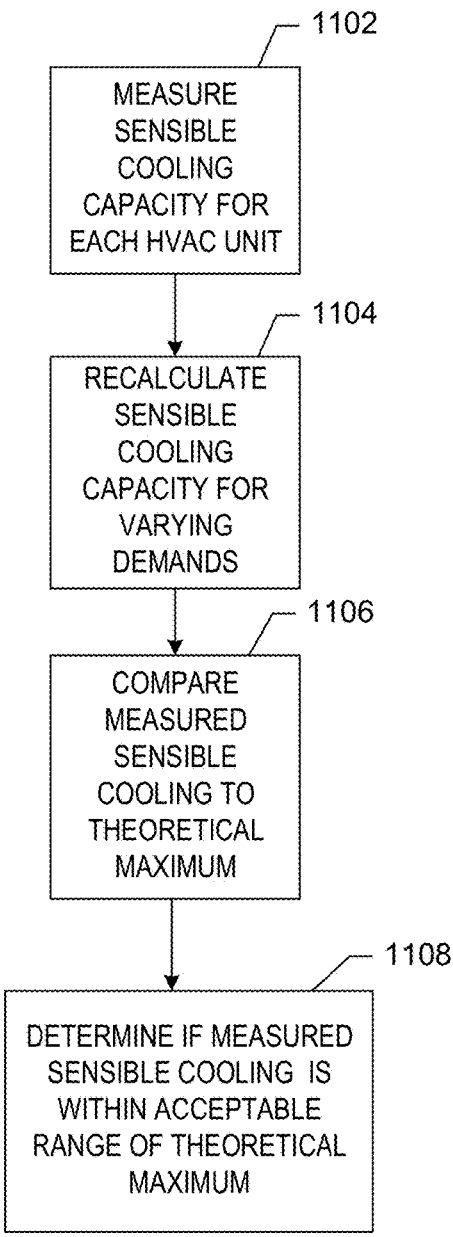
FIG. 11 is a flowchart illustrating a method for determining the efficiency of HVAC units, according to aspects of the present disclosure.

Referring now to FIG. 11, a flow chart of a method 1100 for determining the efficiency status of each HVAC unit is provided. At 1102, the sensible cooling capacity for the HVAC units is measured. At 1104, the sensible cooling capacity determined at 1102 is recalculated to account for a various cooling demands. At 1106, the calculated sensible cooling capacity is compared to the theoretical maximum cooling capacity for each unit. In one aspect, the maximum theoretical cooling capacity is derated to account for environmental conditions of the data facility, including but not altitude and average temperate. At 1108, the system 100 determines if the HVAC units measured sensible cooling capacity falls within one or more predetermined ranges relative to the maximum theoretical cooling capacity, as derated for the environment or other operating conditions. In one aspect, the efficiency of each HVAC unit 108A-K is determined by measuring the sensible cooling capacity for the HVAC unit using the equation:

$$BTU = \text{Volumetric Air flow } (CFM) \times \Delta T \times k;$$

where k is a compensation factor to account for altitude.

The efficiency calculation is performed under various cooling demands. To determine the volume of air moved by each unit (CFM), the manufacture stated values by used. Alternately, the actual values for each unit may be measured using any suitable technique. After determining the sensible cooling for each unit in terms of British thermal units (BTUs), the cooling capacity for each unit may be determine by convert BTU to kW at a conversion rate of approximately 3415 BTUs equals approximately 1 kW. Therefore, the measured cooling capacity of each unit is compared to the theoretical cooling capacity to determine the efficiency of the unit.

In one aspect, if the measured cooling capacity is within 10% of the theoretical cooling capacity rating, the system 100 and/or user may determine that the unit is operating as designed. Conversely, if the measured cooling capacity is only within 11% to 20% of the theoretical cooling capacity rating, the system 100 may determine that the unit is performing below an acceptable level. In addition, the system 100, may automatically determine that this unit is a candidate for being shut down. As previously described, one or more HVAC units 108A-K may be designated as a critical unit.

Referring again to FIG. 4, the floor overview display 400 also provides status indicators 418-424 regarding the operation of a few components of each HVAC unit 108A-K. For example, the indicators 418-424 may provide a quick indication of the satisfactory or unsatisfactory operation of the fan, first cooling compressor, second cooling compressor, and economizer coil, respectively. An additional indicator 426 may be included to alert the user that a valve for the economizer coil may be stuck in an open position potentially reducing the energy efficiency of the unit.

FIG. 5 is a graphic zone mapping display 500 for a single zone 306A-D in the data center. In particular, FIG. 5 provides a view of zone 4 306A, as illustrated in the floor plan display 300 of FIG. 3. In one aspect, the control sequence application 104 generates the zone mapping display 400 for display when a user clicks on one of the interactive elements 308B. In another aspect, a thumbnail 502 of the floor plan display 200 is provided for reference on the zone mapping display 400.

The zone mapping display 500 displays the approximate locations of the HVAC units 108A-C within the zone 306A, as well as the sensors 106A-T within the zone. In various aspects, the sensors 106A-T are further identified by the HVAC unit 108A-C with which they are associated to display the area of impact for the corresponding HVAC units. As previously described, the area of impact refers to area(s) of the data center upon which each the HVAC unit has the most influence, including but not limited to air intakes and outputs. For example, sensors 106A-F include the names "B01-1", "B01-2", "B01-3", "B01-4", "B01-5", and "B01-10" to indicate that are associated with the HVAC unit 108B, named "B01". Similarly, sensors 106G-M are associated with HVAC unit 108A referred to as "B09", while sensors 106N-S are associated with the HVAC unit 108C referred to as "B09". The sensor 106T is a differential pressure sensor and located approximately near the center of the zone 306A.

In one aspect, the sensors 106A-T are wireless temperature sensors that measure temperature, pressure, and/or other data at specific locations within the zone 306A. The positions of the sensors 106A-T are plotted over representations of the IT equipment in a raised floor facility. The data measured by each of the sensors 106A-T may be displayed by hovering over or clicking on the depicted sensors.

In another aspect, the approximate location for each temperature sensor 160A-S will also include a color-coded indicator to represent a temperature range of the data measured by the sensor. For example, the colors red may be used for temperature above 80° F., orange for temperatures between 79-77° F., yellow for temperatures between 76-74° F., or light blue for temperatures between 73-71° F. Other colors and temperature ranges may be used. In addition, the user may also define custom temperature ranges and/or assign any color to the temperature ranges. As shown, the zone mapping display 500 may also include a color-coded chart 504 for reference. In one aspect, the color-coded indicators for the sensors 106A-S are updated in real time during continuous data collection. In another aspect, collecting or obtaining data from the sensors and/or updating the zone mapping display 500 is performed at periodic intervals that may be defined by the user.

FIG. 6 is a zone overview display 600 providing a more detailed overview of information regarding each HVAC unit 108A-C, in the zone 306A, as shown in FIG. 5. The zone overview displays information similar to the floor overview display 400 as shown in FIG. 4. The zone overview display 600 includes data 602-604 for each HVAC unit 108A-C in the zone. In particular, the overview display identifies the current temperature at the input 602 and output 604 for each HVAC unit, as well as the temperature difference 606 between the input and the output (ΔT). The zone overview display 600 further displays data regarding the current drawn, cooling capacity, and maximum theoretical cooling capacity for each unit, indicated as 608-612, respectively.

The zone overview display 600 also provides status indicators 614-628 regarding the status of each HVAC unit 108A-C in the zone 306A and the operational conditions of specific components of each HVAC unit. For example, the indicator 614-622 may provide a quick indication of the satisfactory or unsatisfactory operation of the unit as a whole, the fan, the first cooling compressor, the second cooling compressor, and the economizer coil, respectively. An additional indicator 624 may be included to alert the user that a valve for the economizer coil may be stuck in an open position. Other indicators, such as a communication alarm indicator 626 may be included to alert the user to a communication problem between the computing device 102 and the HVAC units 108A-C or the corresponding sensors. Similarly, a temperature alarm indicator 628 may be included to alert the user to an adverse temperature reading associated with one or more HVAC unit 108A-C. By way of example, green indicators may indicate satisfactory operation, communication, or data, while yellow or red indicators may signal unsatisfactory operation, communication, or data.

The zone overview display 600 also includes data 630 related to total sensor array within the zone. In one aspect, the sensor array data 630 may include the number of sensors in the zone, the number of malfunctioning sensors, as well as indicators regarding the stability of the temperature in the zone, the indication that the zone is configured for one or more HVAC units to be shutdown remotely, and indicators regarding the type of sensors in the zone. The zone overview display 600 also includes information regarding the humidity and pressure with in the zone, indicated as 632.

Figure 7:
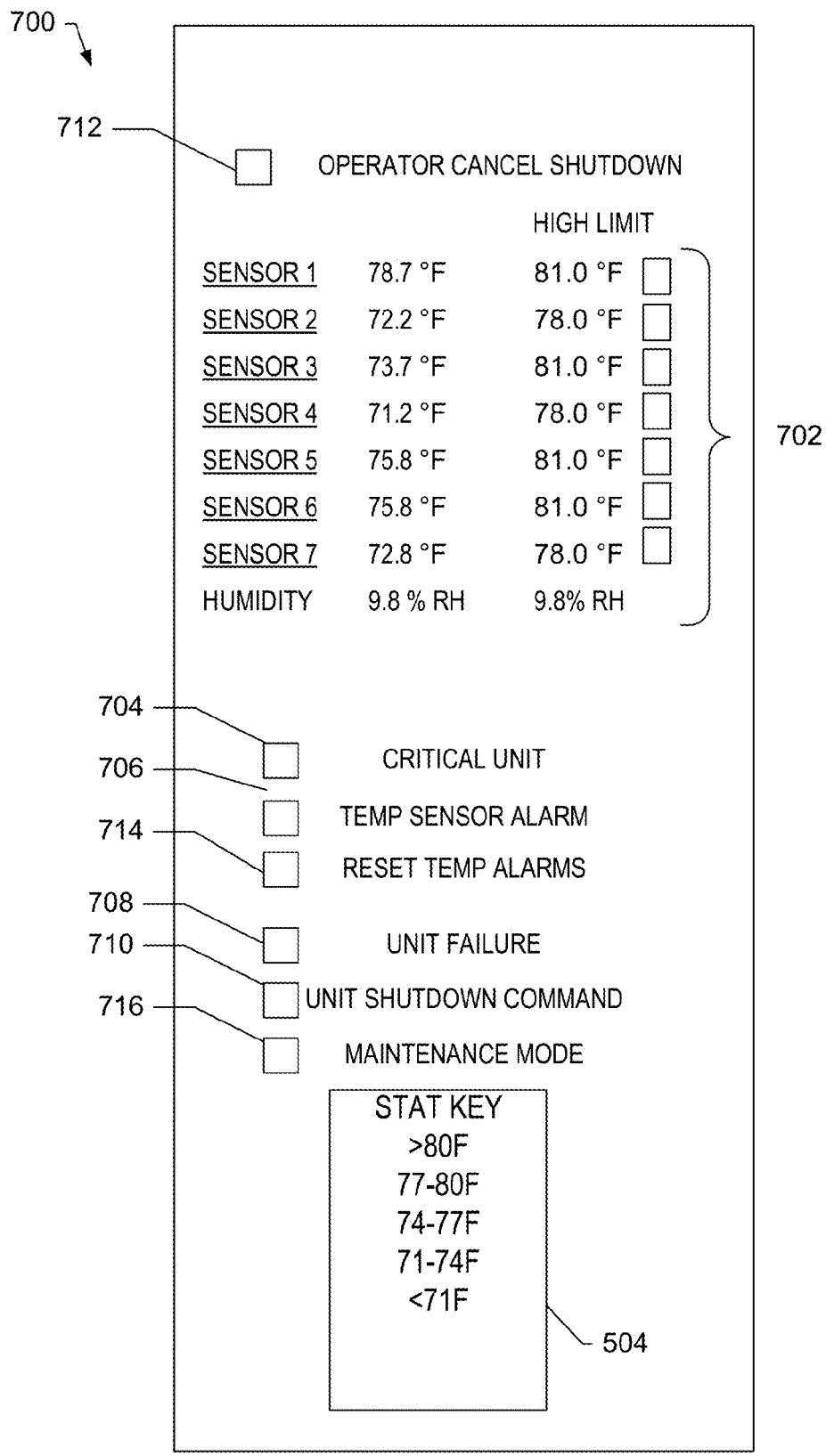
FIG. 7 is an HVAC unit control status graphical display generated by a HVAC control sequence application executing on a computing device, according to aspects of the present disclosure.

FIG. 7 is an HVAC unit control status display 700 that provides the user of the control sequence application 104 with sensor and status data for a particular HVAC unit. In particular, the control status display 700 is an example of a display generated by the control sequence application 104 after a user hovers over or clicks on an interactive element representing one of the HVAC units 108A-K in any of the other displays as shown in FIGS. 3-6. The control status display 700 includes data 702 from each of the sensors on the units area of impact. The temperature readings allow the user to quickly access the extent to which the temperature as deviated away from the acceptable range.

The control status display 700 also provides indications as to whether the unit is a critical unit, whether one of the unit's sensors as triggered a temperature alarm, whether the unit has failed to operate properly other than from a shutdown signal generated by the control sequence application 104, and whether the unit has received a shutdown command from the control sequence application, indicated as 704-710, respectively.

The control status display 700 also provides interactive elements 712-716. The interactive checkbox 712 allows the user to override a shutdown signal generated by the application 104, while the checkbox 714 allows the user to reset any temperature alarms that were automatically triggered in response to adverse temperature data. In addition, the checkbox 716, allows the user to denote a HVAC unit as being in "Maintenance mode" in order to perform repairs, other maintenance or for any prolonged period of time where the unit will remain shut down so that the control sequence application 104 does not continuously generate alarms related to lost communication with the unit or it's sensors.

Figure 8:
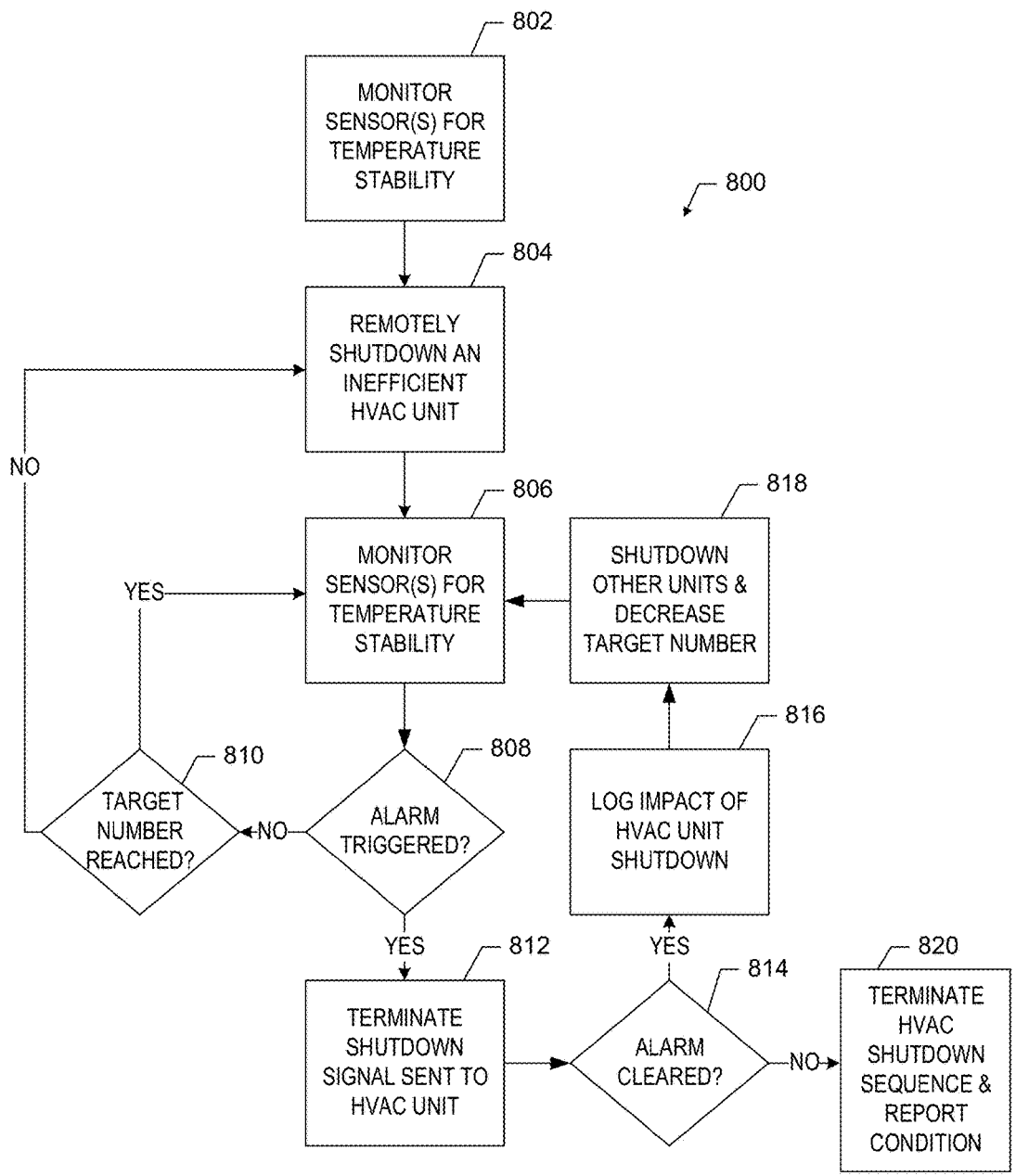
FIG. 8 is a flowchart illustrating a method for controlling the operational sequence of HVAC units, according to aspects of the present disclosure.

FIG. 8 is a flow chart depicting one embodiment of a control scheme 800 performed by the system 100. At 802, the system monitors the sensors to determine if the obtained data is within an acceptable temperature range and initiate the shutdown of the least efficient HVAC units. In one aspect, when the zone is within the desired temperature range, the system 100 monitors the zone for approximately 40 minutes to ensure that the temperature range within the zone is stable prior to remotely shutting down. At 804, the system remotely shuts down the least efficient available unit, as previously described. In another aspect, the area of impact for each unit is also considered when determining which unit to shut down. As such, the system may identify one or more equally inefficient units and select only one unit to shut down based on its area of impact. As described below, the system will shutdown only one unit at a time until the target number of units as been reached.

The system monitors the zone for approximately 20 minutes at 806. During the monitoring process, the system determines if any alarms, including temperature alarms for undesired temperature readings, pressure alarms for undesired static pressure readings, or communication alarms for losses in communication between one or more components of the system 100 are triggered, at 808. If there are no alarms, the system determines whether the target number of units, as described with reference to FIG. 10, have been shut down at 810. If the target number of units has not been reached, yet the measured temperatures remain in the acceptable range, the system returns to 804 and shuts down another unit. Conversely, if the target number of units has been reached, the system continues to monitor the sensors to ensure stability in the facility at 806.

Conversely, if the system detects an alarm at 808, the system may take a number of actions depending upon the severity and extent of the alarm. In one aspect, when a single temperature sensor triggers an alarm, the system terminates the shutdown signal sent to the relevant HVAC(s), whose area of impact contains the sensor that causes the alarm at 812, thereby causing the HVAC unit to return to operation. At 814, the system determines if the alarm conditions cease in response to the resumed operation of the relevant HVAC unit after allowing the temperatures to stabilize. If the resumed operation of the HVAC unit ends the alarm conditions, the system logs the impact felt by the shut down of the HVAC unit at issue for further analysis at 816 and attempts to shut down another HVAC unit at 818. In one aspect, the system also decreases the target number to account for the HVAC unit at issue. Conversely, if the resumed operation of the HVAC unit does not remove the alarm conditions, the system terminates the process 800 and displays a report for the user to investigate the issue further.

In other aspects, the system 100 performs additional actions in response to varied alarm conditions. For example, FIGS. 9A-C are flow charts of automatic processes performed by the system 100 when an adverse condition alarm is triggered during the monitoring phase 806, as shown in FIG. 8.

Figure 9A:
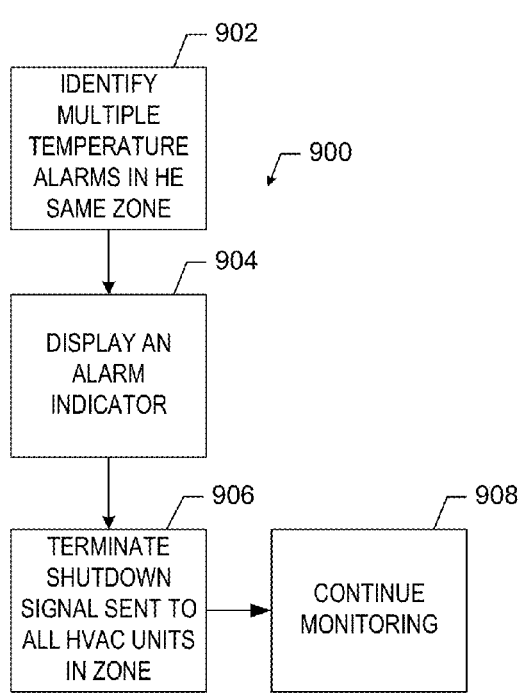
FIGS. 9A-C are flowcharts illustrating other methods for controlling the operational sequence of HVAC units, according to aspects of the present disclosure.
Figure 9B:
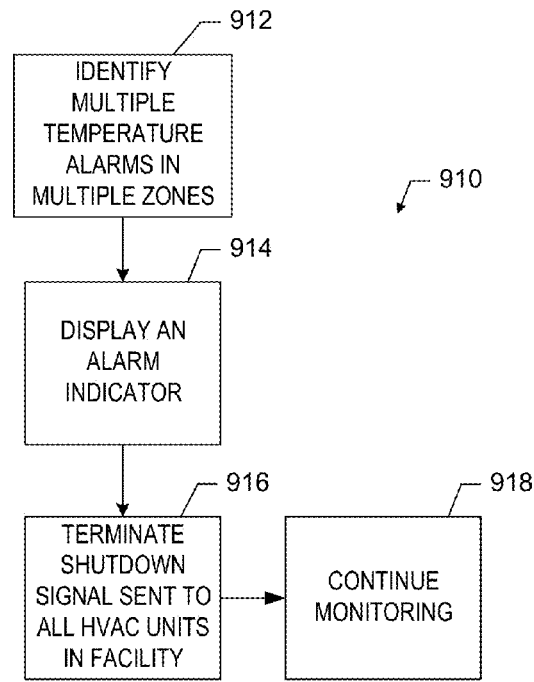
Figure 9C:
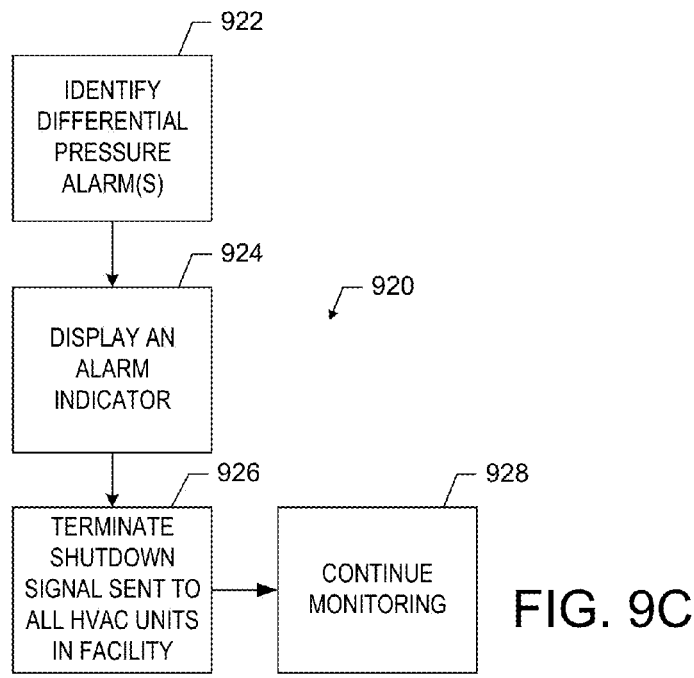

In particular, FIG. 9A is a flow chart depicting a process 900 performed by the system 100 when two or more wireless sensors in the same zone report temperature readings greater than a predetermined maximum temperature for a predetermined duration, such as approximately 5 minutes. At 902, the system 100 identifies multiple temperature alarms in the same zone and at 904, displays an alarm indicator to the user, such as the indicator 628, as shown in FIG. 6. At 906, the system 100 terminates the remote shutdown signal sent to all of the HVAC units in the zone. The system continues the monitor the environment at 908 and may restart the entire HVAC control sequence for the zone, similar to the process 800 as shown in FIG. 8.

If sensors that are more widespread report adverse conditions, including multiple sensors in multiple zones, the system 100 triggers a facility-wide cooling alarm. FIG. 9B is a flow chart depicting a process 910 performed by the system 100 when two or more wireless sensors in multiple zones report temperature readings greater than a pre-defined limit for a predetermined duration. At 912, the system 100 creates a facility cooling alarm and at 914, displays an alarm indicator to the user, such as the indicators 318 and 630, as shown in FIGS. 3 and 6, respectively. At 916, the system 100 terminates the remote shutdown signal sent to all of the HVAC units in entire facility. The system continues the monitor the facility at 918 and may restart the entire HVAC control sequence for the entire facility, similar to the process 800 as shown in FIG. 8.

In addition to responding to adverse temperature data, the system responds automatically to adverse static pressure data and alarms. As shown in FIG. 9C, a process 920 for triggering a pressure alarm if the static pressure in one or more zones falls below a user-defined threshold for a predetermined duration. For example, if the system 100 detects that the static pressure in one or more zones as dropped below a predefined limit, such as approximately 0.02 inches of water for approximately five minutes at 922, the system displays a "Low pressure alarm", similar to 316 and 632 as shown in FIGS. 3 and 6, respectively, at 924. In response to the alarm, the system 100 terminates the remote shutdown signal to all relevant HVAC units, depending on where the alarms are located at 926. In one aspect, only a single zone is affected, while in others the entire facility is affected. The system continues the monitor the facility at 928 and may restart the entire HVAC control sequence for the entire facility, similar to the process 800 as shown in FIG. 8.

In various aspects of the methods 800, 900, 910, and 920 only one unit at a time is shut down or restarted. Conversely, in other aspects, two or more units may be shut down or restarted simultaneously.

Figure 12:
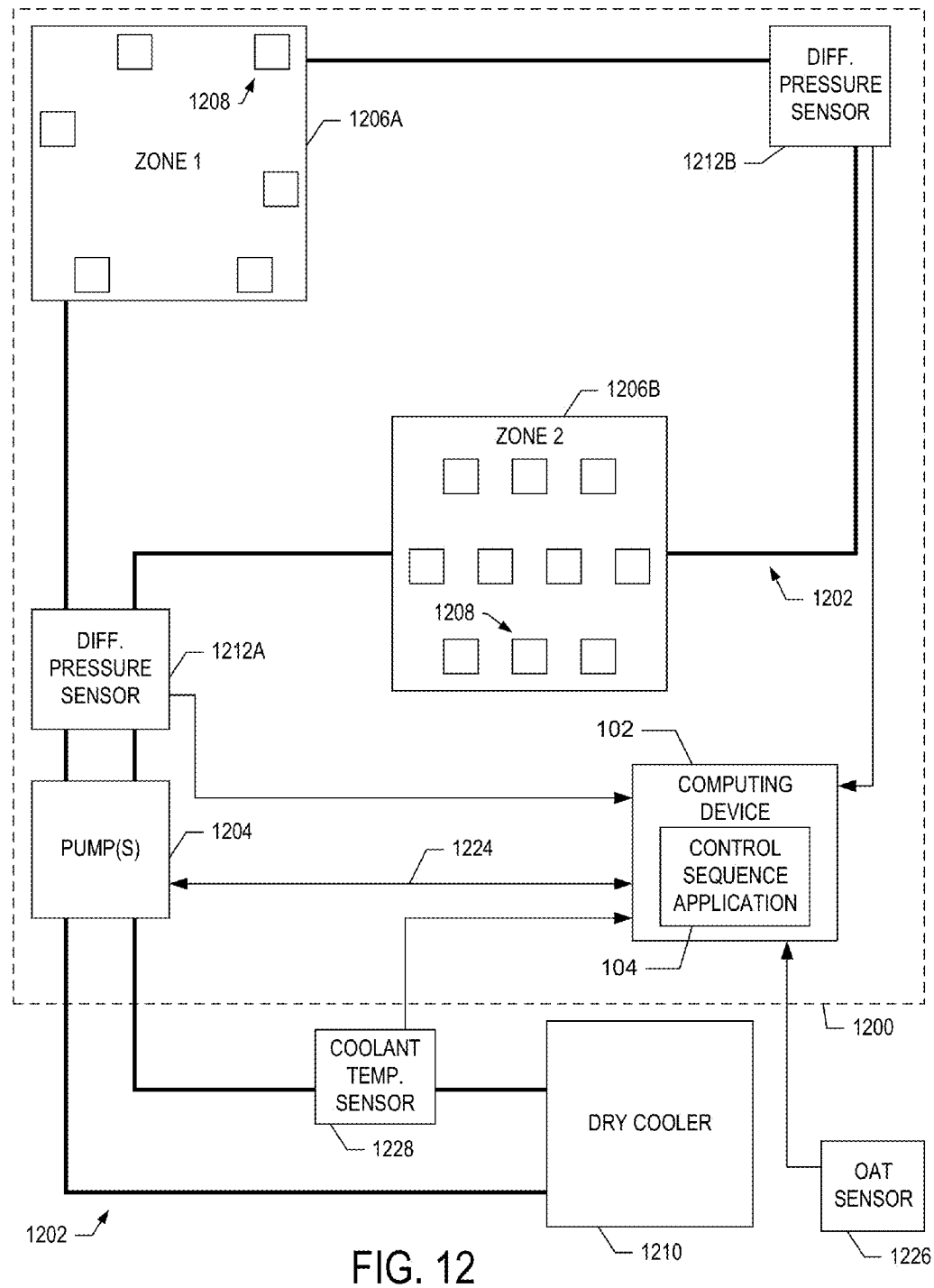
FIG. 12 is block diagram of an embodiment of a data facility cooling loop that may be optimized by the HVAC sequencing system, according to aspects of the present disclosure.
Figure 13:
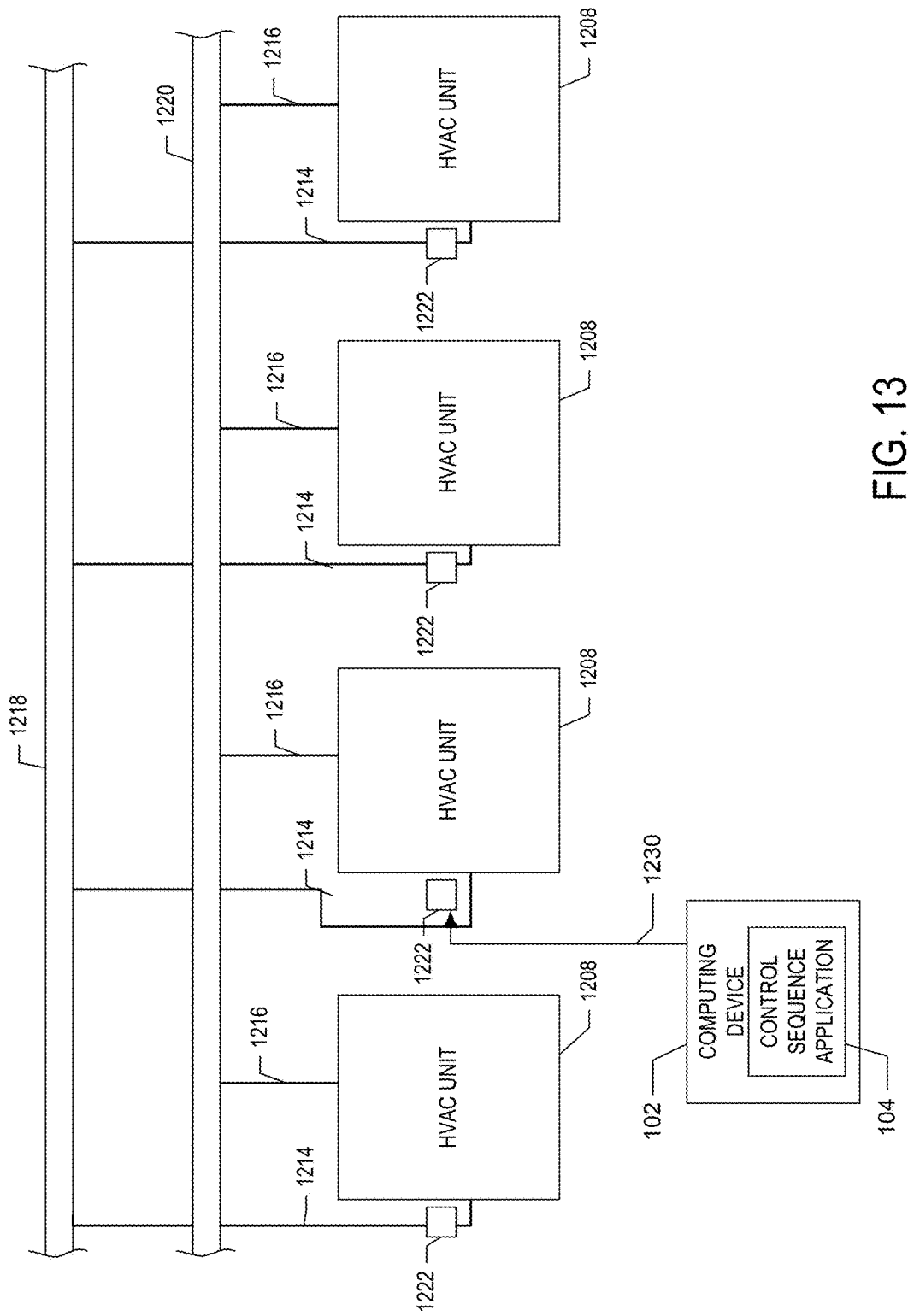
FIG. 13 is block diagram of an embodiment of a data facility cooling loop in communication with a number of HVAC units of the HVAC sequencing system, according to aspects of the present disclosure.

In another embodiment, the HVAC control sequence system 100 controls the operation of HVAC units and components of the coolant system in a facility to optimize the flow of coolant through the facility and thereby, further optimize the energy efficiency of the facility and the HVAC units. In particular, the system 100 may control the operation of the HVAC units and the coolant pumps based, at least in part, on the pressure of the coolant in a coolant loop of the facility. As shown in FIGS. 12-13, an example facility 1200 includes a coolant loop 1202 containing a coolant, such as but not limited to glycol for removing heat from the HVAC units 1208 within the facility. In one aspect, the coolant loop 1202 removes heat from a refrigeration system (not shown) within each HVAC unit. The refrigeration system typically includes a condenser, a compressor, and associated circuits and motors to cool the air within the HVAC unit. As shown, the coolant loop 1202 may also be in communication with one or more coolant pumps 1204 to pump the coolant to one or more areas or zones 1206A-B of the facility and to pump the coolant to a dry cooler system 1210 located outside of the facility. As used herein, a dry cooler system, such as the dry cooler system 1210, refers to a cooling device or arrangement, typically located outside of the data facility where one or more fans draws air across a series of coils in a coolant loop, such as the coolant loop 1202 to remove heat from the coolant. The dry cooler system 1210 may be any dry cooler device, arrangement, or system as understood by one having ordinary skill in the art to remove heat from a coolant using ambient air.

In this embodiment, the HVAC control sequence system 100 monitors the differential pressure of the coolant within the coolant loop 1202. For example, the computing device 102 executing the control sequence application 104 receives data from one or more differential pressure sensors 1212A-B to determine a pressure across the coolant loop 1202. The differential pressure sensors 1212A-B may be any differential pressure sensor or arrangement of sensors suitable for measuring the pressure drop in a coolant system. The differential pressure sensors 1212A-B measure the difference in pressure between the supply and return portions of the coolant loop 1202, in part to determine if the difference exceeds a user-defined threshold.

As shown, one differential pressure sensor 1212A is positioned near an outlet of the coolant pump 1204 that provides coolant to the various zones 1206A-B of the facility. In addition, a second differential pressure sensor 1212B is position at a point at or near the portion of the coolant loop that is farthest from the coolant pump 1204. In one aspect, the differential pressure sensor 1212B is positioned at or near the farthest portion of the coolant loop to account for the variations in coolant pressure caused by any HVAC unit(s) located far from the coolant pump 1204. In a typical facility, the pressure drop through the coolant loop 1202 is typically in a range between approximately twelve pounds per square inch (psi) and fifteen psi.

FIG. 13 depicts the coolant loop 1202 as connected to the HVAC units 1208 within a zone, such as zone 1 1206A. As shown, in one embodiment each HVAC unit 1208 is associated with a local supply 1214 and return 1216 that are in fluid communication with the supply 1218 and return of the 1220 of the facility coolant loop 1202. The flow of coolant through the local supply and return 1214 and 1216, respectively, is regulated by one or more isolation valves 1222 that are closed when the corresponding HVAC unit is shutdown. The isolation valves 1222 may be positioned to control coolant flow through the local supply 1214, the local return 1216, or both.

By way of example, when an HVAC unit 1208 is shutdown, a coolant pump within the unit (not shown) is also shutdown. As no coolant is necessary at the shutdown unit, the isolation valve 1222 is closed to isolate the HVAC unit 1208 from the coolant loop 1202, thus reducing the power necessary at the coolant pump 1204 to pump coolant throughout the coolant loop 1202. In particular, as the isolation valve 1222 closes the overall pressure in the coolant loop 1202 will increase, beyond a user-defined threshold. As a result, the operation of the coolant pump 1204 may be scaled back to maintain the differential pressure within the coolant loop 1202 at a user-defined level (e.g. 15 psi). In particular, the electrical energy provide to the coolant pump 1204 may be decreased, thereby decreasing the total electrical load drawn at the facility.

The HVAC control sequence system 100 monitors the differential pressure in the coolant loop 1202, as measured by the differential pressure sensors 1212A-B, to vary the operation of the coolant pump 1204 to alter and optimize the flow of coolant in the coolant loop 1202. In particular, the computing device 102 generates at least one signal 1224 received at the coolant pump 1204 to alter the operation of the pump. The signal 1224 may be transmitted and received via wireless or wireline communication. In addition, the HVAC control sequence system 100 may shutdown or, alternately, start/re-start one or more HVAC units 1208 to alter and optimize the flow of coolant in the coolant loop 1202.

In another embodiment, the HVAC control sequence system 100 optimizes the energy efficiency of a data facility by the use of free cooling. This is accomplished by controlling the operation of the dry cooler system 1210 based on a variable coolant temperature threshold for the temperature of the coolant for each HVAC unit 1208, as well as the overall temperature of one or more coolant loops, such as but not limited to the coolant loop 1202. For example, in one aspect the coolant may be the glycol in the coolant loop 102. In another aspect, the coolant may be chilled water that circulates through the HVAC units 1208.

The variable coolant temperature threshold of the coolant loop 1202 is the difference between the temperature of the coolant and the OAT, wherein the HVAC control sequence system 100 may control the operation of one or more HVAC units 1208 to rely on free cooling. In this embodiment, the coolant loop 1202 is cooled by the dry cooler system 1210, as shown in FIG. 12. In particular, the HVAC control sequence system 100 can change the set temperature point of the coolant loop 1202 at which the facility will rely predominately on free-cooling for removing heat from the coolant, in or at near real time.

By way of example, if the coolant circulated to capture heat rejected by an HVAC unit 1208 is approximately eight degrees cooler in temperature than the air temperature at the HVAC unit's return, then the isolation valve 1222, will remain open to allow a portion of the coolant to circulate through one or more coils or loops at or near a return to pre-cool the air. In this example, the isolation valve 1222 may remain open, even is the refrigeration system of the HVAC unit 1208 has been shut down in response to a signal from the control application 104.

In one aspect, the pre-cooling further cools the air exiting the HVAC unit 1208, thereby increasing the cooling capacity of the HVAC unit without the use of energy to operate the refrigeration system. In another example, where the temperature of the coolant is 45° F. while the return air temperature is approximately 76° F., then the cooling capacity of the HVAC unit 1208 may be improved by approximately 100% without the use any motors to drive compressors within the HVAC unit 1208.

To implement free cooling at the HVAC units 1208, the computing device 102 executing the control sequence application 104 receives data regarding the outside air temperature (OAT) from one or more OAT sensors 1226 as well as the temperature of the coolant from at least one coolant temperature sensor 1228 and the return air temperature for each HVAC unit from sensors, such as the sensors 106A-D, as previously described. In response to a temperature difference between the coolant temperature, which is cooled via dry cooling at a sufficient lower OAT, and the air temperature at the HVAC unit 1208 return, the control sequence application 104 generates a signal 1230 received at the isolation valve 1222 to open the valve and pre-cool the return air. The generated signal 1230 may be received at an isolation valve 1222 that is retrofitted to existing HVAC unit installations. Alternately, the signal 1230 may be received at an HVAC unit 1208 that already includes an isolation valve. The signal 1230 may be transmitted and received via wireless or wireline communication.

In addition to pre-cooling the air at the return, the HVAC control sequence system 100 optimizes the energy efficiency of a data facility using free cooling, as previously described, to minimize the usage of the refrigeration systems within the HVAC units 1208. In particular, the computing device 102 executing the control sequence application 104 receives data regarding the outside air temperature (OAT) from one or more OAT sensors 1226 as well as the temperature of the coolant from a coolant temperature sensor 1228 and varies the operation of the dry cooler system 100 to remove heat from the coolant loop 1202. As the energy required to operate the fans of the dry-cooler system is typically less than the energy necessary to operate the refrigeration systems of the HVAC units 1208. The HVAC control sequence system 100 automatically causes to the data facility to use free cooling predominantly.

As a result, when the OAT is sufficiently lower than the desired air temperature within the data facility (e.g., the air at the return plenums of the HVAC units), the target number of HVAC units 1208 to be shutdown may be lower than a target number determine solely using calculations of the critical load, as previously described. In particular, greater energy efficiency for the entire data facility may be achieved by operating one or more HVAC units 1208 with free cooling as opposed to operating the data center with a minimal number of HVAC units as determined by the critical load of the facility.

Figure 14:
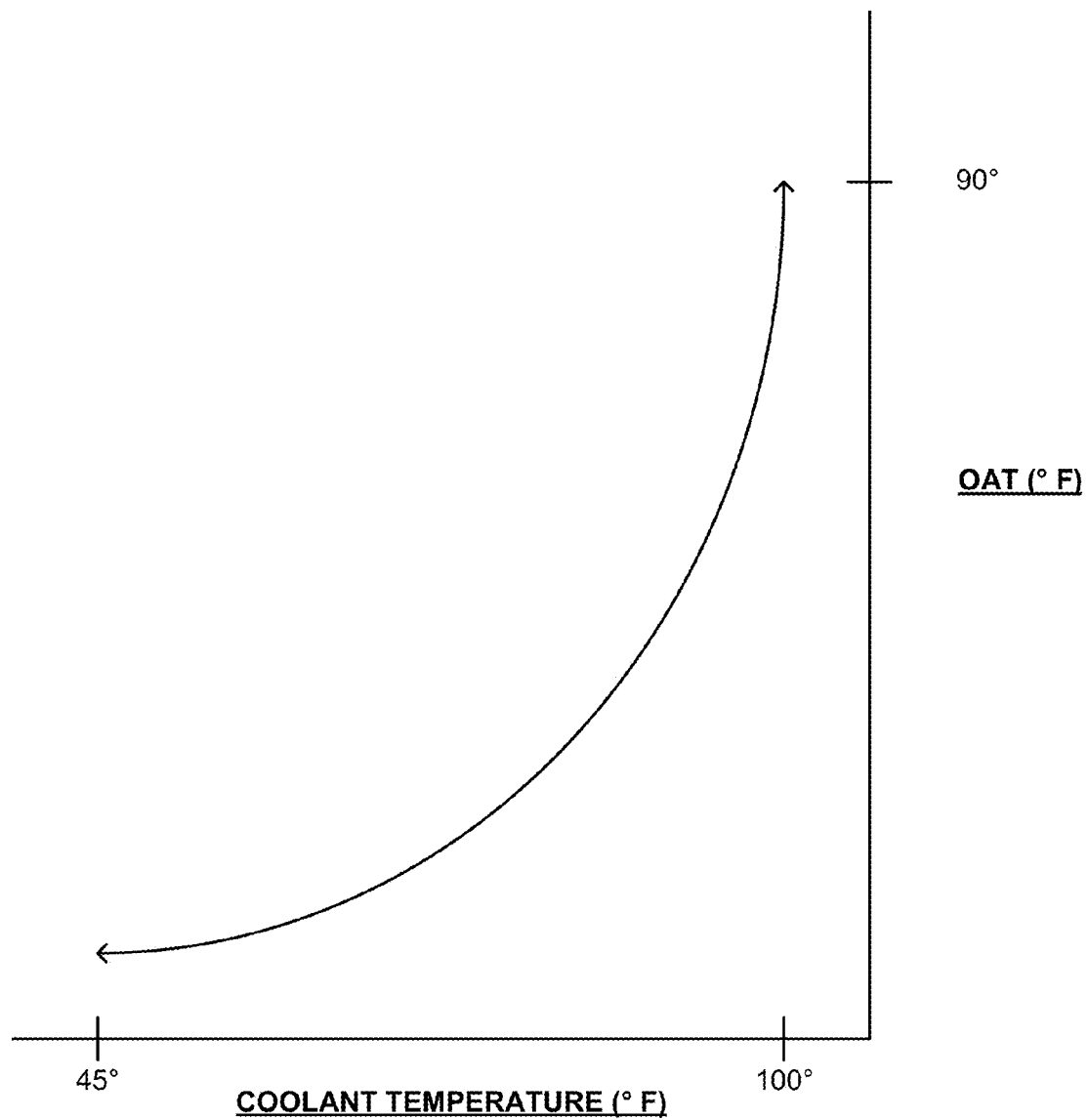
FIG. 14 is a graph depicting the relationship between the outside air temperature and the temperature of the coolant in the coolant loop, according to aspects of the present disclosure.

By way of example and not limitation, the HVAC control sequence system 100 may rely more on free cooling when the difference between the desired air temperature in the facility and the OAT is approximately thirty-five degrees F. or more. In this example, the control sequence application 104 may identify an operating "window" for one or more of the HVAC units 1208 to use free cooling instead of cooling the air using the HVAC unit refrigeration systems. In one aspect, the operating window may be identified where an HVAC unit 1208 can provide approximately twenty to thirty tons using free cooling. In another aspect, the window is identified by the temperature difference between the desired air temperature in the facility and the OAT. The window expands when the desired temperature for the air in the data facility increases. For example, if the desired air temperature is approximately 80° F., then free cooling may be used when the OAT is approximately 45° F. or less. When the window or at least a partial window for free cooling exists, the application 104 may alter the targeted number of units 1208 for shutdown. FIG. 14 is a graph depicting the relationship between the outside air temperature and the temperature of the coolant in the coolant loop 1202. As shown, a minimum approach of approximately ten degrees is desired; however, as explained more fully below, the system 100 can automatically adjust operation of the HVAC units 1208 and dry cooler system 1210 to take advantage of greater approach temperatures that occur naturally.

For example, if the target shutdown number determined using the critical load is five out of ten HVAC units 1208, the system would shut down or modify the operation of the five units to keep the refrigeration systems of the units operating or at least loaded properly to fall within the critical load limits. In another embodiment, where there is sufficient capability to perform free-cooling, the application 104 can generate one or more signals to turn on or restart one or more HVAC units 1208 after the five identified units have been shut down. Alternately, in another aspect, the application 104 may alter the target number during the process of shutting down the identified units to rely on partial. In this aspect, the application 104 may account for the energy necessary to drive the fans of the dry cooler and may determine that it is more energy efficient to operate the HVAC units 1208 with free cooling or pre-cooling as described above.

Figure 15A:
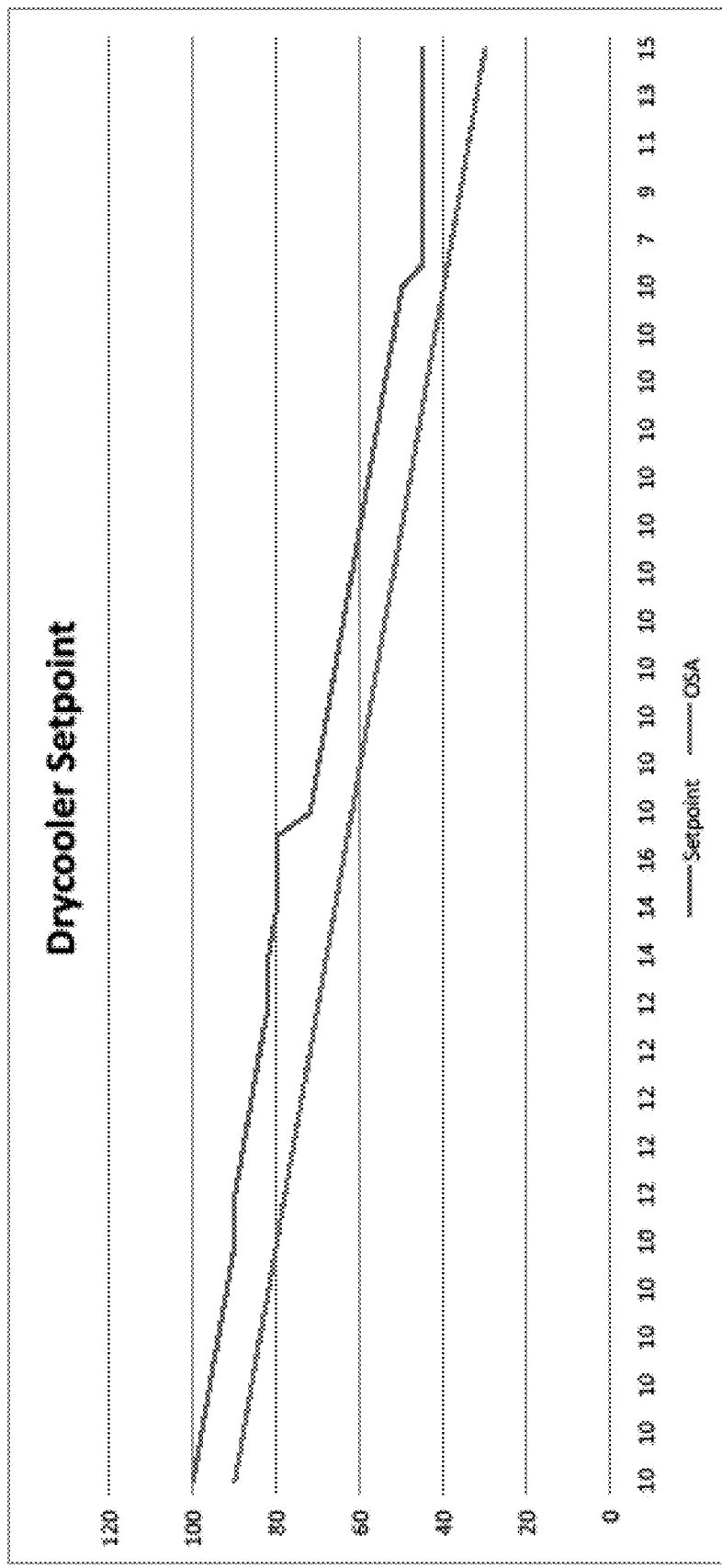
FIGS. 15A-B are graphs depicting example set points for a dry cooler system relative to the outside air temperature according to aspects of the present disclosure.
Figure 15B:
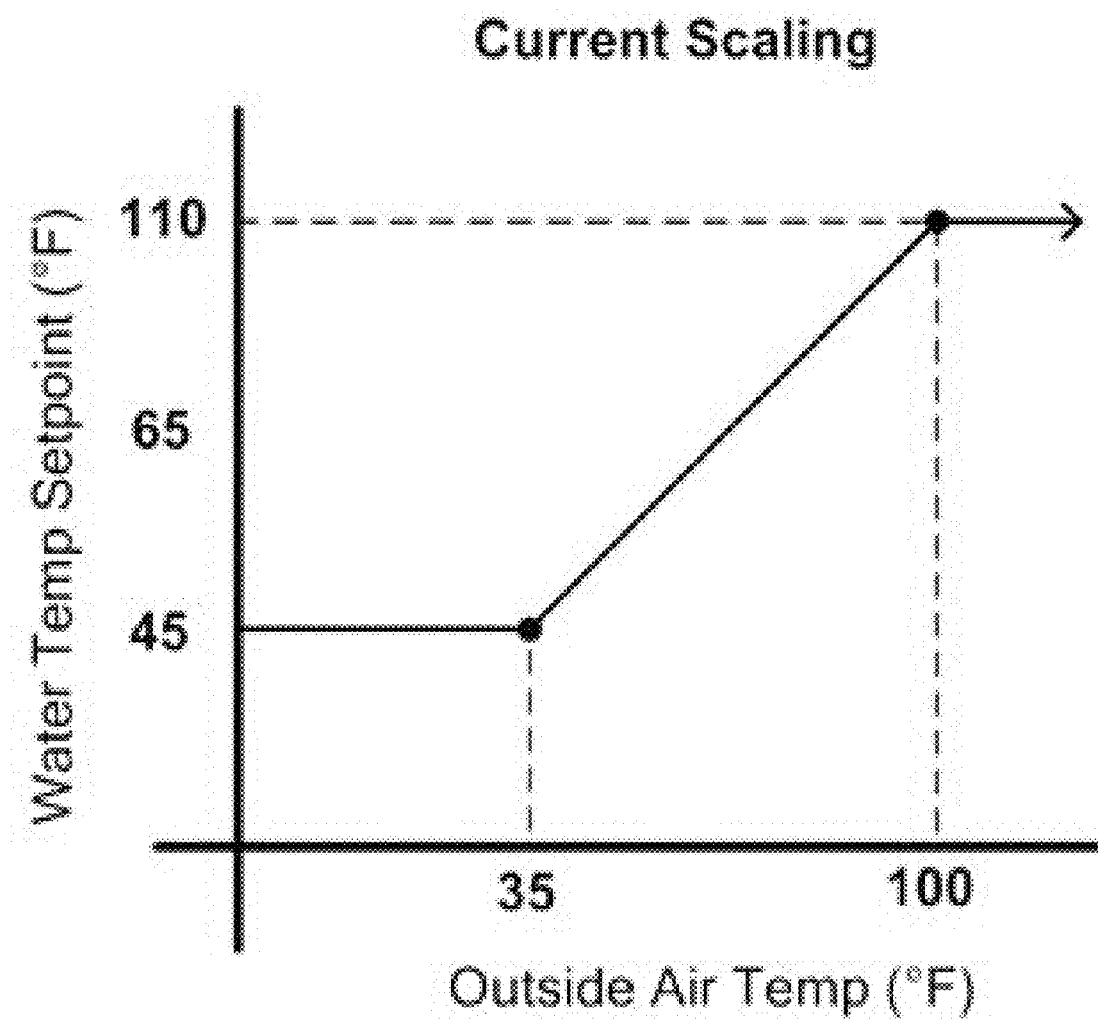

In addition, where the application 104 identifies changes in the critical load or in response to one or more alarms determines that the previously shutdown HVAC units 1208 should be restarted, the application may identify fewer then all of the shutdown units to restart and cool using free cooling and/or pre-cooling. FIGS. 15A-B depict graphs showing examples of the relationship between air temperature at the return and the coolant temperature during pre-cooling. In various embodiments, where the window for free cooling is identified by the difference between desired air temperature in the facility and the OAT, the variable coolant temperature threshold and the size of the window may be changed, in or at near real time. As such, an OAT set point, used by the application 104 to calculate the variable coolant temperature threshold is configurable and may be changed dynamically. Similarly, the coolant temperature used to calculate the variable coolant temperature threshold may is also configurable and may be changed dynamically. Therefore, the system 100 may automatically change the operation of the HVAC units to maximize the use of free cooling in response either to changes in the OAT or to changes within the facility.

For example, as the outside air temperature drops, the control application 104 may generate one or more signals to prolong or increase the duration and speed of operation for the dry cooler fans, or alternatively, turn the fans off based on the level of heat rejection achieved. In this aspect, the control of the dry cooler fans is varied in response to the outside air temperature, the critical load of the facility, and the level of heat rejection as determined by data from the coolant temperature sensors 1228. In particular, the control application 104 can determine whether the system 100 is sufficiently taking advantage of free cooling. As such, for each data facility initial energy optimization plans based solely on critical load data may be recalculated automatically by the system 100 to control the operation of the HVAC units 1208. In some examples, this may result in the operation of greater or fewer HVAC units 1208 due to the energy efficiency of free cooling.

The HVAC control sequence system 100 may rely on feedback and data for the critical load of the facility as it relates to the efficiency of the HVAC units 1208, the differential pressure in the coolant loop 102, and the capability for free cooling to optimize the overall efficiency of the data center, as well as optimizing the energy efficiency of shutting down or restarting each individual HVAC unit. In one aspect, monitoring the differential pressure in the coolant loop 1202 allows the process of powering on or off each individual HVAC unit 1208 more energy efficient, while monitoring the coolant temperature and the ability to make use of free cooling allows the application 104 to identify and shutdown selected HVAC units 1208 that have the greatest effect of the energy optimization of the data facility as a whole.

By way of example, the shut down of an HVAC unit 1208, may bring about an increase in the differential pressure of the coolant in the coolant loop 1202. In response, the control sequence application 104 generates the signal 1224 to alter the operation of the coolant pump 104 which results in a corresponding change to the critical load of the facility. This change in the critical load of the facility affects the calculated efficiency of each HVAC unit 1208 as determined by the control sequence application 104.

Conversely, the energy efficiency of each HVAC unit may be improved by lowering the temperature of the coolant loop 1202. As such, the control sequence application 104 may identify other HVAC units 1208 for shutdown, including those not previously identified to be shutdown in order to lower the amount of heat rejected to the coolant loop 1202. This secondary identification is made base, at least in part, on data gathered from the various sensors 1212A-B, 1226, and 1228 to determine and revise, if necessary, a sequence for controlling the operation of the HVAC units 1208 after the shutdown or restart of one or more other units.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for controlling the operation of one or more heating, ventilation, and air conditioning (HVAC) units comprising:
    a database comprising HVAC unit data and environmental condition threshold data; and
    a processor to communicate with one or more sensors, the database, and a plurality of HVAC units, the one or more sensors to measure at least one environmental condition and generate environmental condition data, the processor to:
        obtain a target number of the one or more HVAC units to be shut down;
        obtain environmental condition data from the one or more sensors;
        identify an inefficient HVAC unit of the plurality HVAC units;
        generate a shutdown signal to shut down the inefficient HVAC unit;
        obtain the environmental condition data from the one or more sensors after the shutdown of the inefficient HVAC unit; and
        determine if the shutdown of the inefficient unit has an adverse impact on the environmental condition data.

2. The system of claim 1, when the shutdown of the inefficient unit has an adverse impact on the environmental condition data, the processor to:
    terminate the shutdown signal to the inefficient HVAC unit; and
    obtain environmental condition data from the one or more sensors after the inefficient HVAC unit has resumed operation; and
    determine if the resumed operation of the inefficient HVAC unit remedies the adverse impact on the environmental condition data.

3. The system of claim 2, wherein the resumed operation of the inefficient HVAC unit remedies the adverse impact, the system further comprising:
    the processor to:
        decrease the target number by one.

4. The system of claim 1, when the shutdown of the inefficient unit does not have the adverse impact on the environmental condition data, the processor to:
    identify another inefficient HVAC unit of the plurality of HVAC units, wherein the other inefficient HVAC unit is the least efficient HVAC unit still in operation;
    generate the shutdown signal to shut down the other inefficient HVAC unit;
    obtain the environmental condition data generated by the one or more sensors after the shutdown of the other inefficient HVAC unit; and
    determine any changes between the environmental condition data obtained before the shutdown of the inefficient HVAC unit and the environmental condition data obtained after the shutdown of the other inefficient HVAC unit or between the environmental condition data obtained after the shutdown of the inefficient HVAC unit and the environmental condition data obtained after the shutdown of the other inefficient HVAC unit.

5. The system of claim 4, wherein the shutdown of the inefficient unit or the shutdown of the other inefficient unit does not cause the adverse impact on the environmental condition data, the system further comprising:
the processor to:
continuously and repeatedly obtain additional environmental condition data from the one or more sensors;
identify additional inefficient HVAC units; and
generate additional shutdown signals until the target number has been reached.

6. The system of claim 5, wherein the most inefficient HVAC unit of the plurality of HVAC units is shutdown first and the additional inefficient HVAC units are shutdown in an order based on increasing efficiency.

7. The system of claim 1, wherein the at least one environmental condition is selected from a group consisting of air temperature, outside air temperature, humidity, relative humidity, differential pressure, static pressure, and combinations thereof.

8. The system of claim 1, wherein the adverse impact comprises at least one of a temperature reading above a maximum threshold value, a maximum humidity reading above a maximum threshold value, a minimum humidity reading below a minimum threshold value, a differential pressure below a threshold value, a static pressure below a threshold value, or insufficient communication between the processor and at least one of the one or more sensors.

9. The system of claim 1, wherein the target number of the plurality of HVAC units to be shutdown is determined automatically by the processor or based on input by a user of the system.

10. The system of claim 1, wherein the processor automatically determines the target number of the plurality of HVAC units to be shutdown, the processor to:
obtain a total electrical load drawn from a direct current power plant and an uninterruptable power supply by equipment cooled by the plurality of HVAC units;
obtain a required electric load required by the plurality of HVAC units to achieve a total sensible cooling capacity for a facility using the system;
obtain the difference between the total electric load and the required electrical load to determine an excessive cooling capacity drawn by the plurality of HVAC units; and
divide the excess cooling capacity by a total number of the plurality of HVAC units to obtain the target number.

11. The system of claim 10, wherein the target number is rounded down to the nearest integer.

12. The system of claim 1, wherein at least one of the one or more sensors is a wireless sensor.

13. The system of claim 1, wherein at least one of the one or more sensors is located within an area of impact for at least one of the plurality of HVAC units.

14. The system of claim 1, wherein a facility using the system is divided into a plurality zones, and each zone includes at least one of the plurality of HVAC units, the system further comprising:
the processor to:
determine if an adverse impact on the environmental condition data is in response to the at least one environmental condition measured at two or more of sensors in at least one zone of the plurality of zones;
terminate the shutdown signal sent to all HVAC units in the at least one zone.

15. The system of claim 1, wherein a facility using the system is divided into a plurality zones, and each zone includes at least one of the plurality of HVAC units, the system further comprising:
the processor to:
determine if an adverse impact on the at least one environmental condition is measured by at least one sensor of the one or more sensors in two or more zones of the plurality of zones;
terminate the shutdown signal sent to all HVAC units in the facility.

16. The system of claim 1, wherein the inefficient HVAC unit draws the electric load in excess of the required electric load.

17. The system of claim 1 further comprising:
one or more multi-terminal relay switch in communication with at least one HVAC unit of the plurality of HVAC units, wherein the shutdown signal generated by the processor closes the multi-terminal relay switch to shut down the inefficient HVAC unit.

18. The system of claim 1 wherein at least one of the one or more sensors measures a differential pressure in a coolant loop of the plurality of HVAC units, the system further comprising the processor to:
determine if the differential pressure increases above a threshold level after the shutdown of the inefficient HVAC unit; and
generate a control signal to a coolant pump of the cooling loop to decrease the pressure within the coolant loop, wherein the control signal decreases the electrical load at the coolant pump.

19. The system of claim 1, when the shutdown signal also closes an isolation valve of the inefficient HVAC unit.

20. A method for automatically controlling the operation of a plurality of heating, ventilation, and air conditioning (HVAC) units comprising:
identifying a target number of the plurality of HVAC units to be shutdown;
obtaining data generated by one or more sensors, wherein the one or more sensors measure at least one environmental condition;
identifying an inefficient HVAC unit of the plurality of HVAC units;
shutting down the inefficient HVAC unit;
obtaining data from the one or more sensors after shutting down the inefficient HVAC unit to identify changes between the data obtained before shutting down the inefficient HVAC unit and the data obtained after shutting down the inefficient HVAC unit; and
determining if the shutdown of the inefficient unit causes an adverse impact on the data generated by the one or more sensors.

21. The method of claim 20, when the shutdown of the inefficient unit does not cause the adverse impact on the data generated by the one or more sensors, the method further comprising:
identifying another inefficient HVAC unit of the plurality of HVAC units, wherein the other inefficient HVAC unit is the least efficient HVAC unit still in operation;
shutting down the other inefficient HVAC unit; and
after shutting down the other inefficient HVAC unit, obtaining data generated by the one or more sensors after shutting down the other inefficient HVAC unit to identify changes between the data obtained before shutting down the inefficient HVAC unit and the additional data obtained after shutting down the other inefficient HVAC unit or between the data obtained after shutting down the inefficient HVAC unit and the data obtained after shutting down the other inefficient HVAC unit.

22. The method of claim 21, wherein the shutdown of the inefficient unit or the other inefficient unit does not cause the adverse impact on the data generated by the one or more sensors, the method further comprising:
repeating the obtaining of data from the one or more sensors;
repeating the identifying of additional inefficient HVAC units, and
repeating the shut down of additional inefficient HVAC units until the target number has been reached.

23. The method of claim 22, when the shutdown of the inefficient unit causes the adverse impact on the data generated by the one or more sensors, the method further comprising:
restarting operation of the inefficient HVAC unit;
obtaining data from the one or more sensors after restarting the operation of the inefficient HVAC unit to determine if the resumed operation remedies the adverse impact on the data generated by the one or more sensors; and
decreasing the target number by one.

24. A non-transitory computer-readable medium encoded with instructions for a system for automatically controlling operation of a plurality of HVAC units, the system comprising one or more sensors, a database comprising data about the operating capacities of each of the plurality of HVAC units and environmental condition threshold values, and a processor in communication with the one or more sensors and the plurality of HVAC units; the instructions, executable by the processor, comprising:
identifying a target number of the plurality of HVAC units to be shutdown;
obtaining data generated by the one or more sensors, wherein the one or more sensors measure data regarding at least one environmental condition;
identifying an inefficient HVAC unit of the plurality of HVAC units;
generating a shutdown signal to be received at a multi-terminal relay switch operatively engaged to the inefficient HVAC unit, wherein the shutdown signal closes the multi-terminal relay switch to shut down the inefficient HVAC unit;
obtaining data generated by the one or more sensors after the shutdown of the inefficient HVAC unit to identify changes between the data obtained before the shutdown and the data obtained after the shutdown; and
determining if the shutdown of the inefficient unit causes an adverse impact on at least one of the one or more environmental conditions.

25. The non-transitory computer-readable medium of claim 24, when the shutdown of the inefficient unit does not cause the adverse impact on the at least one environmental condition, the instructions further comprising:
continuously and repeatedly obtaining additional data from the one or more sensors;
identifying additional inefficient HVAC units; and
generating additional shutdown signals to be received at the additional inefficient HVAC units until the target number has been reached.

26. The non-transitory computer-readable medium of claim 24, when the shutdown of the inefficient unit causes the adverse impact on the data generated by the one or more sensors, the method further comprising:
restarting operation of the inefficient HVAC unit;
obtaining data generated by the one or more sensors after restarting the operation of the inefficient HVAC unit to determine if the resumed operation of the inefficient HVAC unit remedies the adverse impact; and
decreasing the target number by one.

27. A system for controlling the operation of one or more heating, ventilation, and air conditioning (HVAC) units in a facility comprising:
a database comprising HVAC unit data and environmental condition threshold data; and
a processor to communicate with one or more sensors, the database, and a plurality of HVAC units, the one or more sensors to measure a temperature of a coolant in a coolant loop and an outside air temperature, the processor to:
obtain coolant temperature from the one or more sensors;
determine a difference between the temperature of the coolant and the outside air temperature;
determine an amount of free cooling available to at least one HVAC unit of the plurality of HVAC units when the difference between the temperature of the coolant and the outside air temperature is above a variable coolant temperature threshold;
generate a refrigeration shutdown signal to shut down a refrigeration system of the at least one HVAC unit; and
determine the effect of the shutdown of the refrigeration system of the at least one HVAC unit on a critical load of the facility.

28. The system of claim 27, wherein the shutdown of the refrigeration system decreases the critical load of the facility, the processor to:
obtain another coolant temperature, wherein the other coolant temperature is obtained after the shutdown of the refrigeration system of the at least one HVAC unit;
determine another difference between the other coolant temperature and the outside air temperature;
determine another amount of free cooling available to at least one other HVAC unit of the plurality of HVAC units based on the other difference, when the other difference between the other coolant temperature and the outside air temperature is greater than the variable coolant temperature threshold; and
generate another refrigeration shutdown signal to shut down another refrigeration system of the at least one other HVAC unit.

29. The system of claim 27, wherein the coolant loop is cooled by a dry cooler system.

30. The system of claim 29, wherein the operation of one or more fans of the dry cooler system is increased by a signal generated at the processor to increase the free cooling available.

31. The system of claim 29, wherein database comprises data on the critical load of the facility, the processor to:
determine a net change on critical load of the facility in response to the shutdown of the refrigeration system of the at least one HVAC unit and the increased operation of the dry cooler system; and
determine an optimal number of the plurality of HVAC units to operate by free cooling to minimize the critical load of the facility.

* * * * *